United States Patent
Cunningham

(10) Patent No.: US 6,280,135 B1
(45) Date of Patent: Aug. 28, 2001

(54) AUTOMATED ROTARY DIE STORAGE AND RETRIEVAL UNIT WITH COMPLEMENTARY ROTARY DIE STORAGE RACK AND COMPLEMENTARY ROTARY DIE STORAGE CART

(75) Inventor: George R. Cunningham, Marion, IN (US)

(73) Assignee: Greene Line Manufacturing Company, Marion, IN (US)

( * ) Notice: Subject to any disclaimer, the term of this patent is extended or adjusted under 35 U.S.C. 154(b) by 0 days.

(21) Appl. No.: 09/310,439

(22) Filed: May 12, 1999

(51) Int. Cl.[7] ........................................... B65G 1/04
(52) U.S. Cl. ........................ 414/280; 414/277; 414/282
(58) Field of Search ................................ 414/274, 277, 414/278, 280, 282

(56) References Cited

U.S. PATENT DOCUMENTS

| | | | |
|---|---|---|---|
| 940,878 | * 11/1909 | Jones et al. | 414/282 |
| 3,782,565 | * 1/1974 | Doran et al. | 414/277 |
| 4,406,570 | * 9/1983 | Duncan et al. | 414/282 |
| 4,690,602 | 9/1987 | Castaldi et al. | 414/282 |
| 4,756,657 | * 7/1988 | Kinney | 414/280 |
| 4,773,807 | * 9/1988 | Kroll et al. | 414/282 |
| 4,838,749 | * 6/1989 | Potocjnak | 414/277 |
| 5,002,449 | 3/1991 | Kita et al. | 414/273 |
| 5,051,051 | * 9/1991 | Grabill | 414/282 |
| 5,147,176 | 9/1992 | Stolzer et al. | 414/786 |
| 5,226,782 | 7/1993 | Rigling | 414/283 |
| 5,379,229 | 1/1995 | Parsons et al. | 364/478 |
| 5,397,211 | 3/1995 | Lloyd et al. | 414/663 |
| 5,630,692 | * 5/1997 | Hanaya | 414/277 |
| 5,791,852 | * 8/1998 | Bibby et al. | 414/278 |
| 5,839,872 | * 11/1998 | Goto et al. | 414/280 |
| 6,042,322 | * 3/2000 | Piccini | 414/282 |

\* cited by examiner

*Primary Examiner*—James W. Keenan
(74) *Attorney, Agent, or Firm*—Woodard, Emhardt, Naughton, Moriarty & McNett

(57) ABSTRACT

A rotary die storage and retrieval unit, a rotary die storage rack, and a rotary die storage cart are disclosed. The unit is for an automated storage of a rotary die upon a rotary die shelf and for an automated retrieval of a rotary die from upon the rotary die shelf. The rotary die shelf is disposed within the rack, and accessible through a side opening of the rack. The rotary die shelf is either adjoined to the rack, or adjoined to the cart which is disposed within any embodiment of the rack capable of housing the cart. A frame of the unit is movably mountable to the rack. When the frame is movably mounted to the rack, the frame is operative to be aligned with the rotary die shelf. A carriage of the unit is movably mounted to the frame and is also operative to be aligned with the rotary die shelf. When the frame and the carriage are aligned with a rotary die shelf, the unit includes a shuttle movably mounted to the carriage that is operable to be extended into the side opening of the rack and to be subsequently retracted from the side opening of the rack. Consequently, the rotary die can be stored upon the rotary die shelf or retrieved from upon the rotary die shelf.

56 Claims, 19 Drawing Sheets

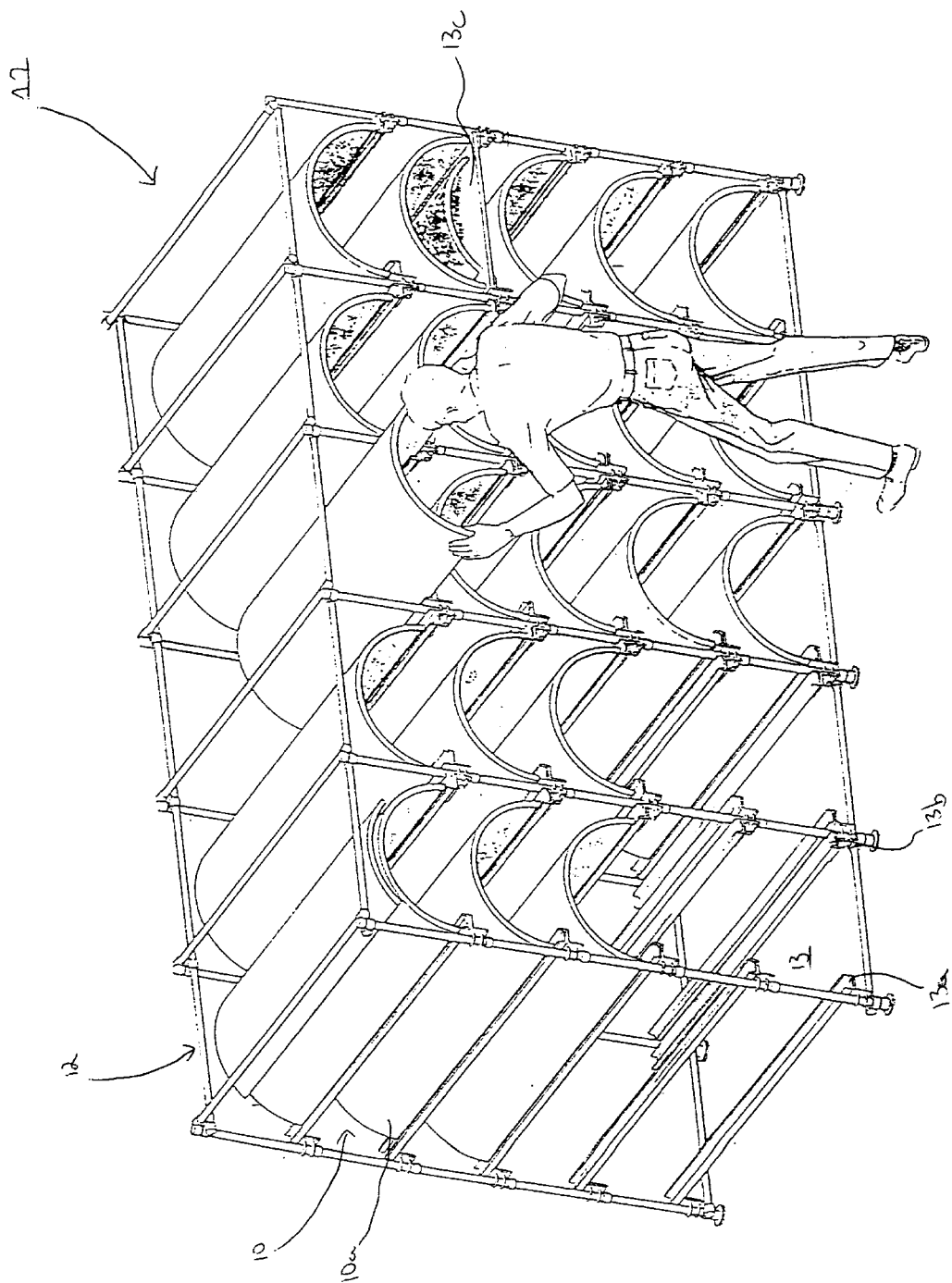

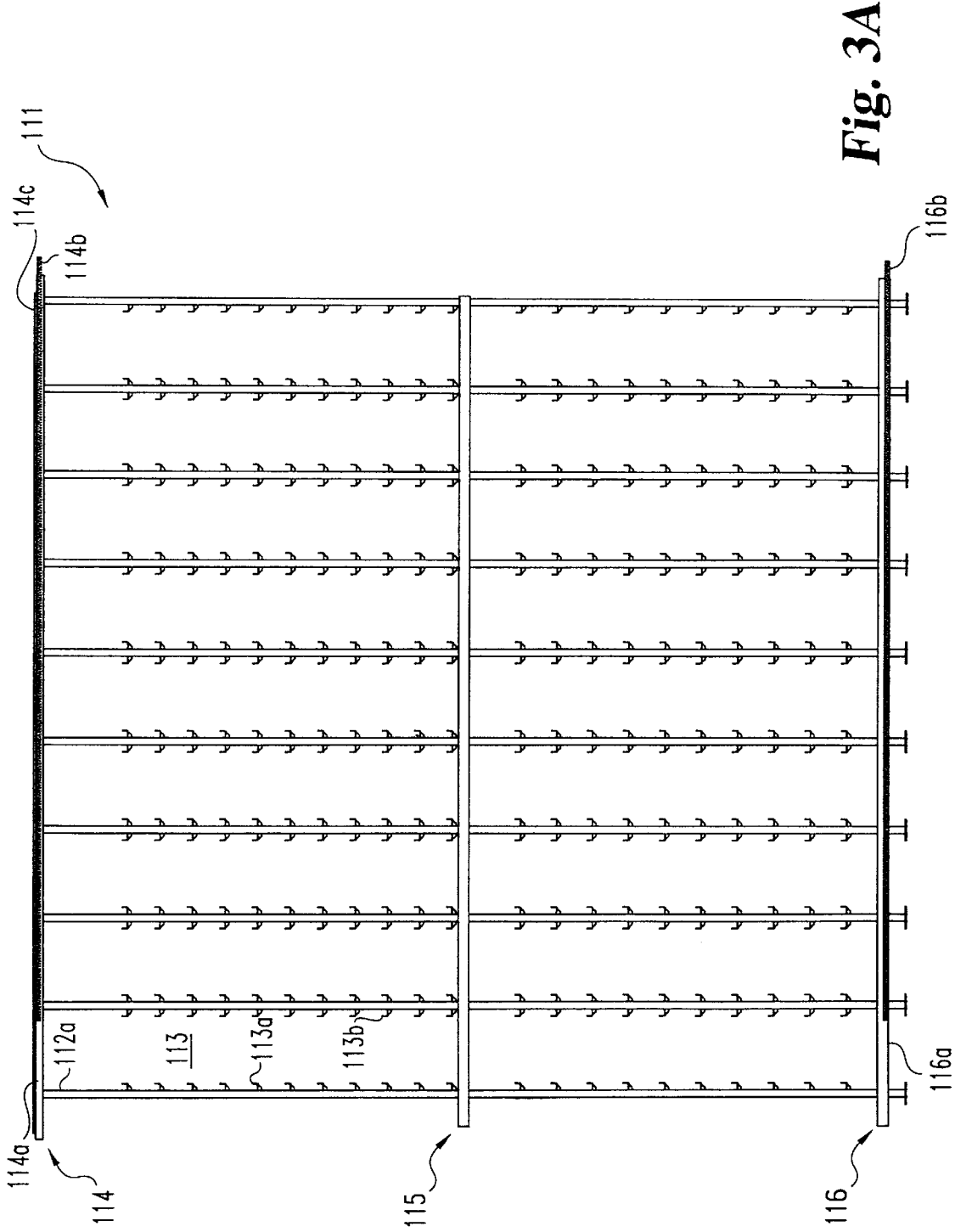

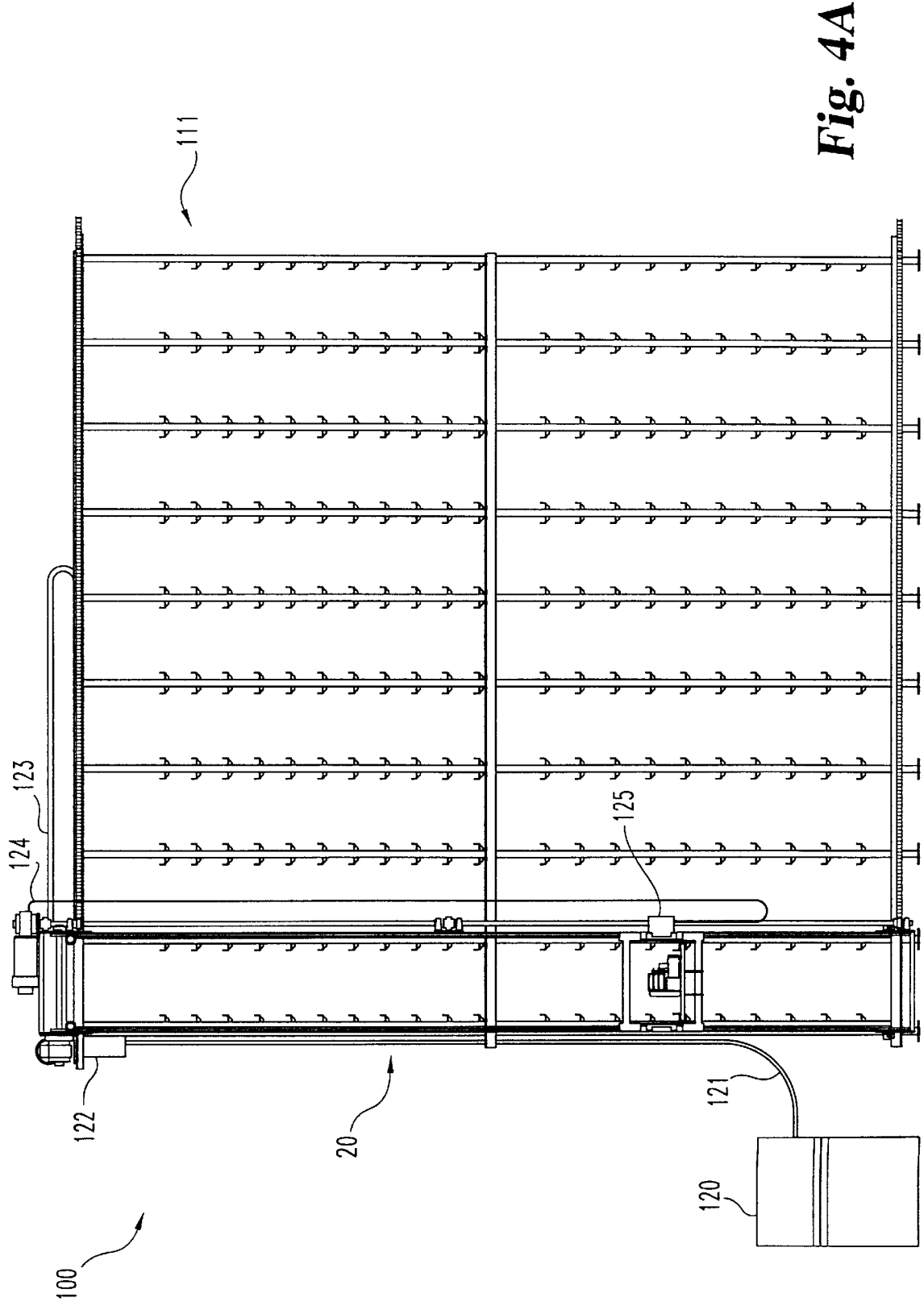

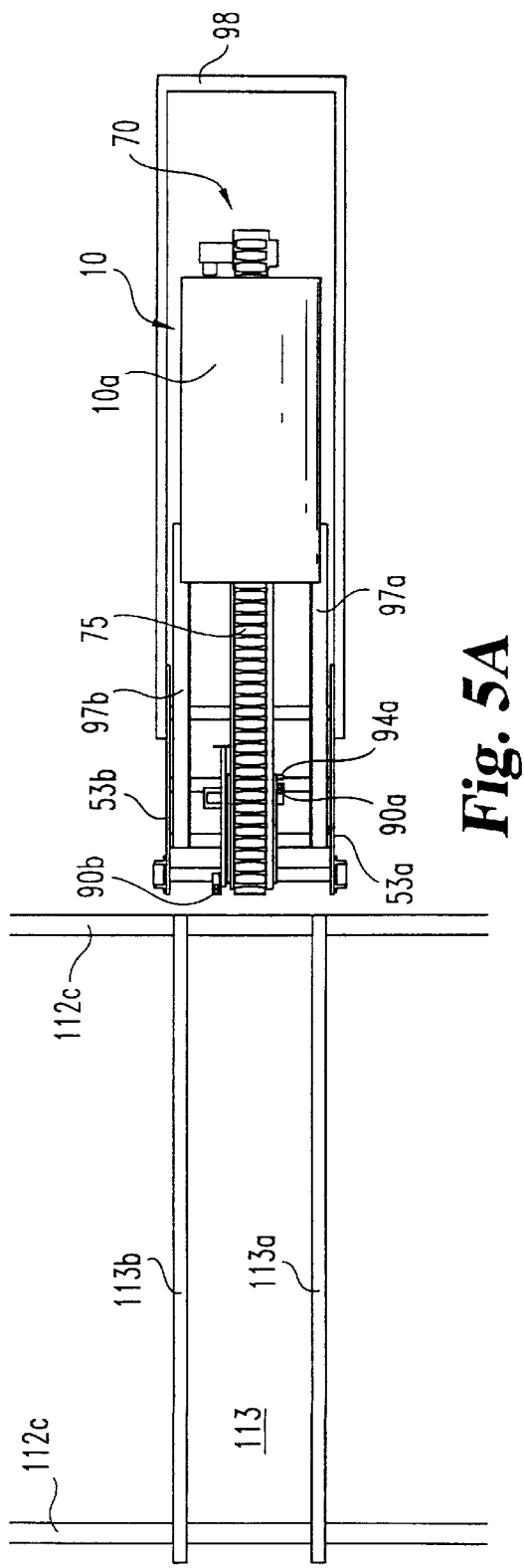
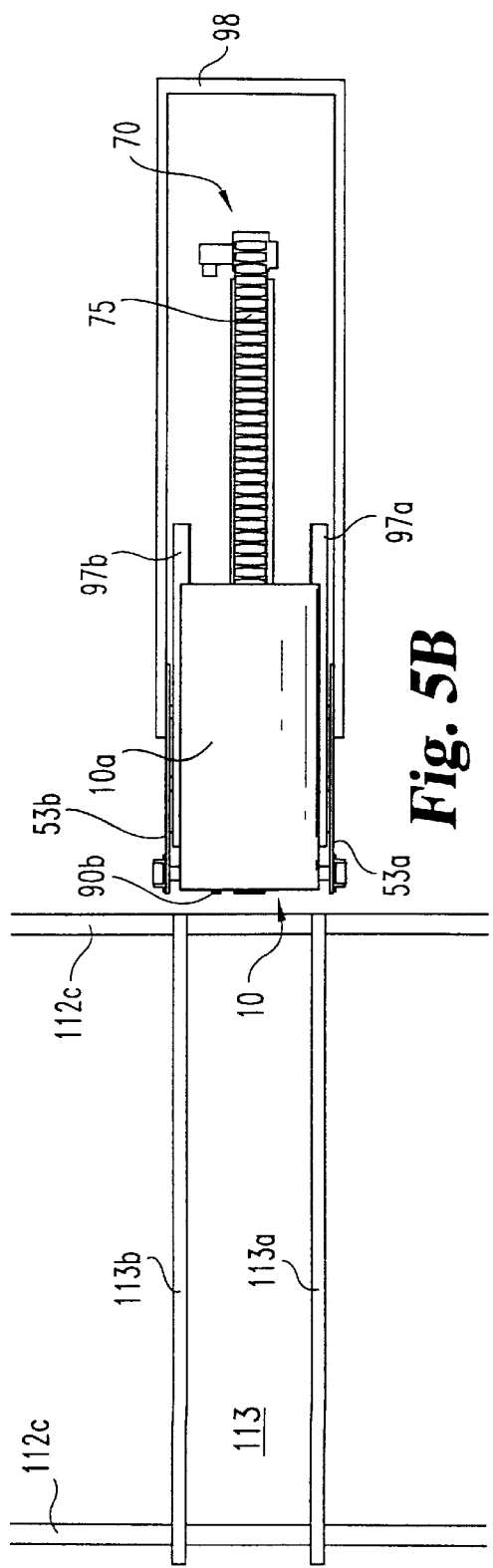
Fig. 5A
Fig. 5B

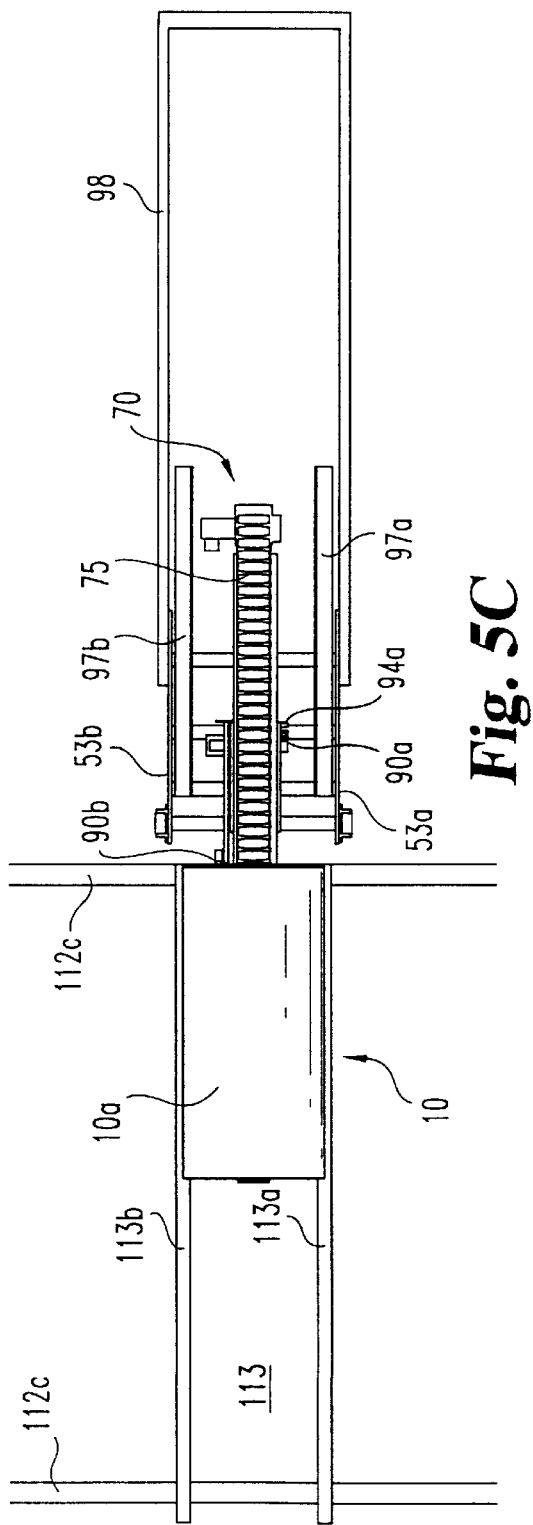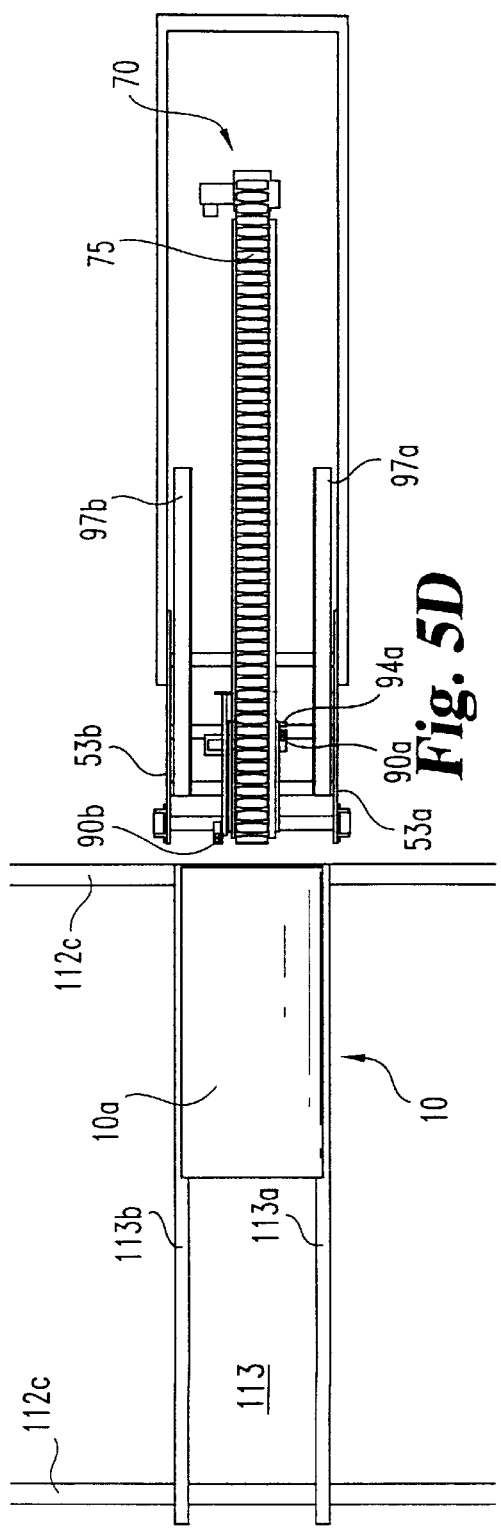

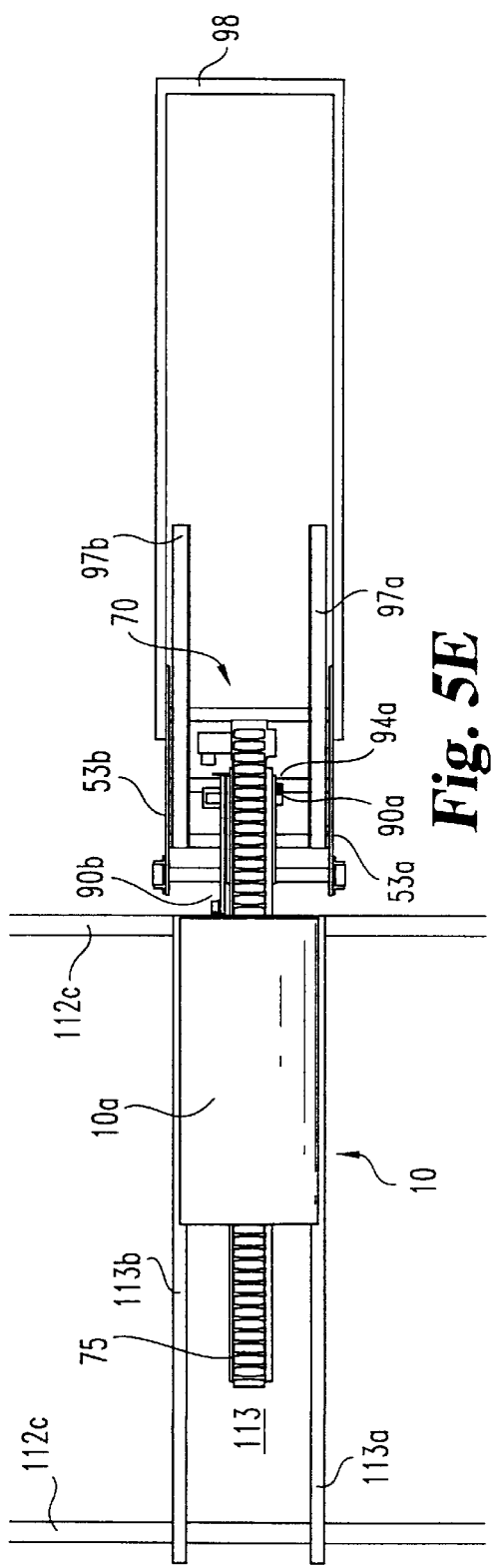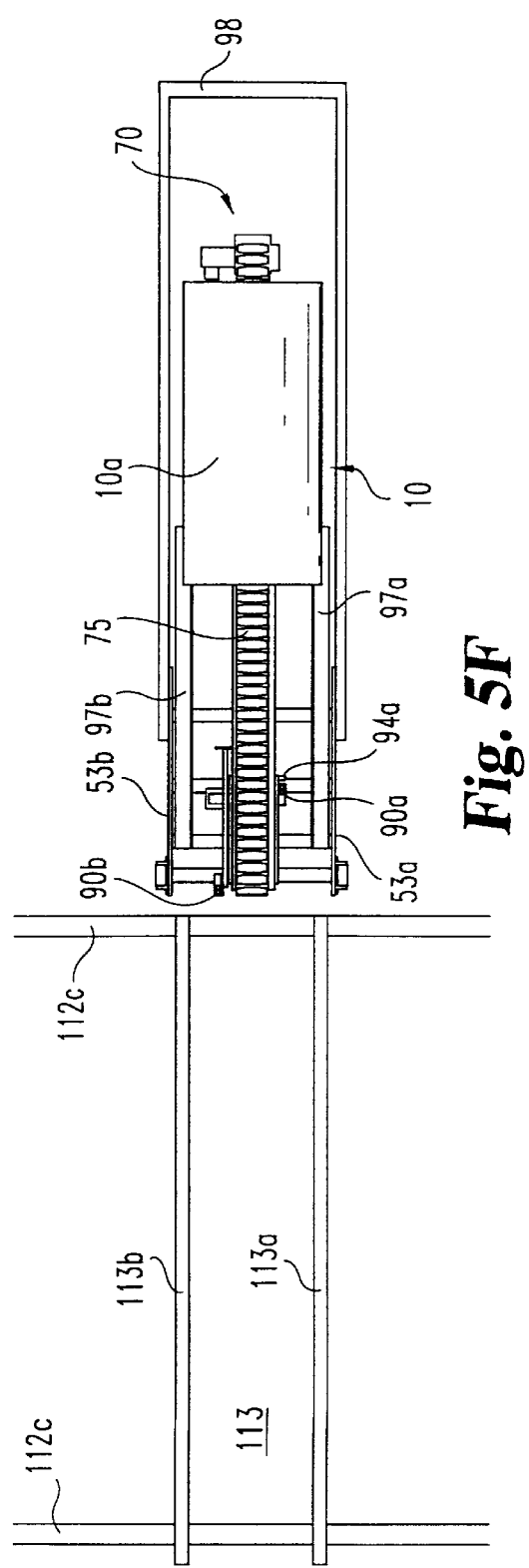

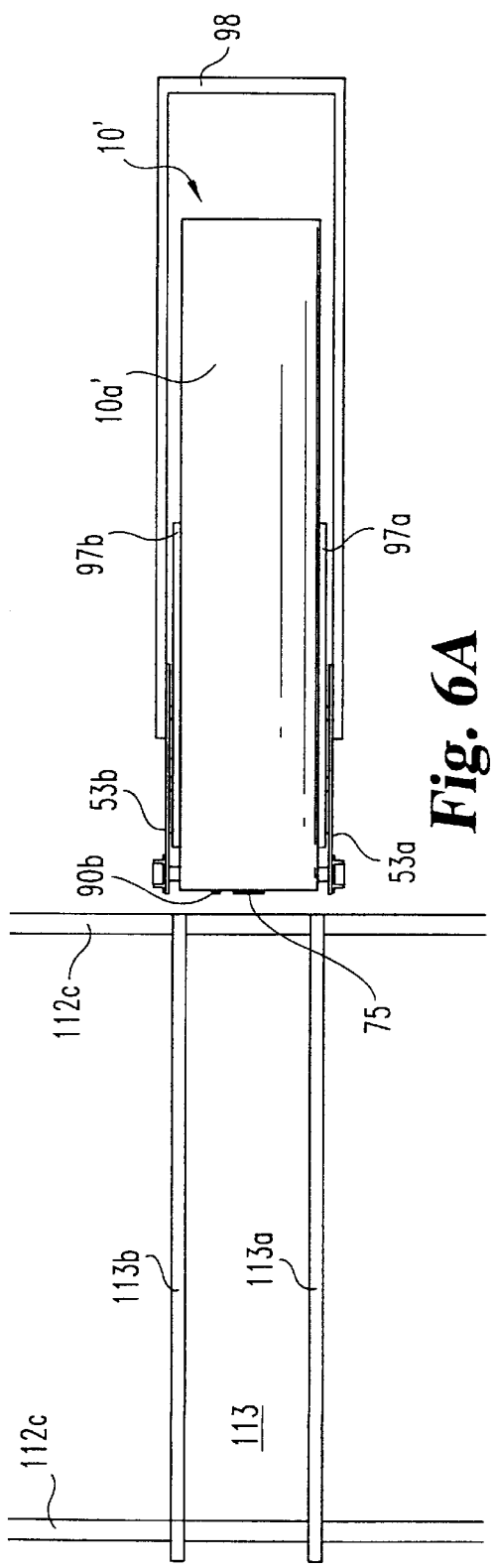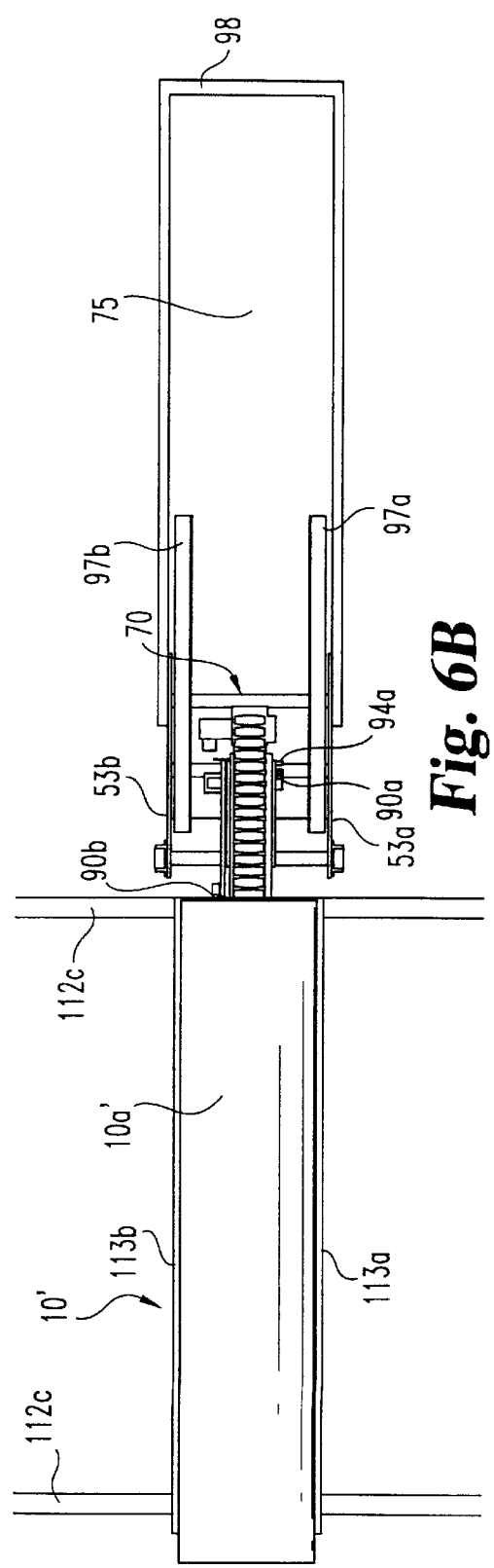

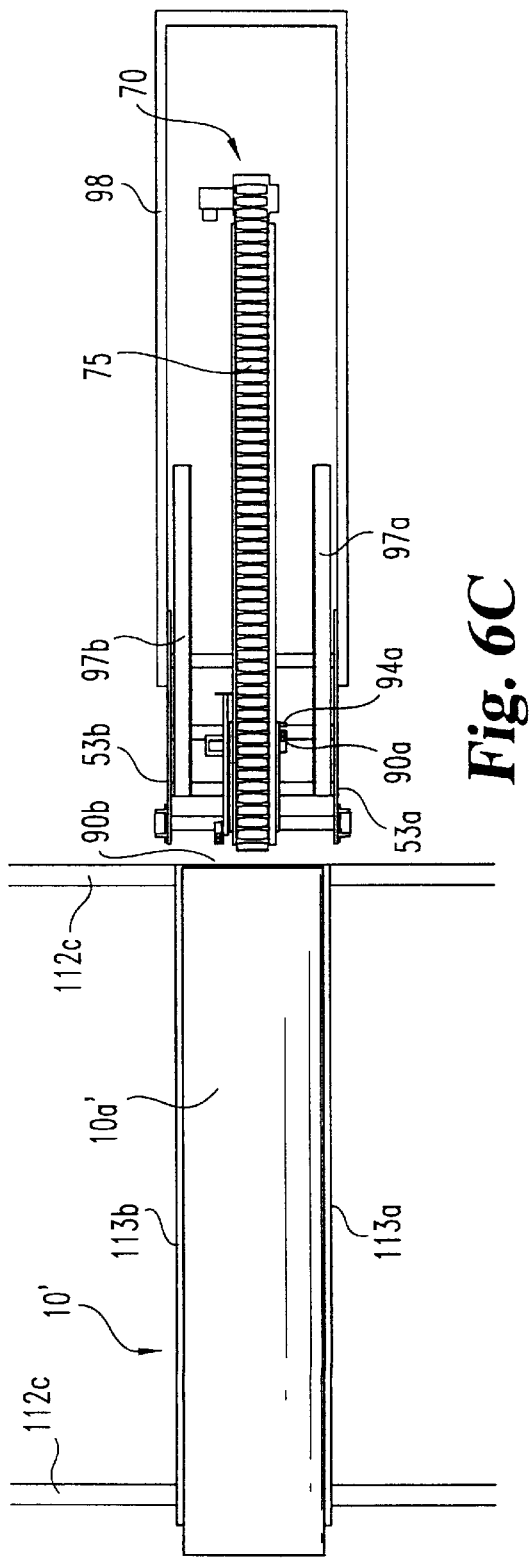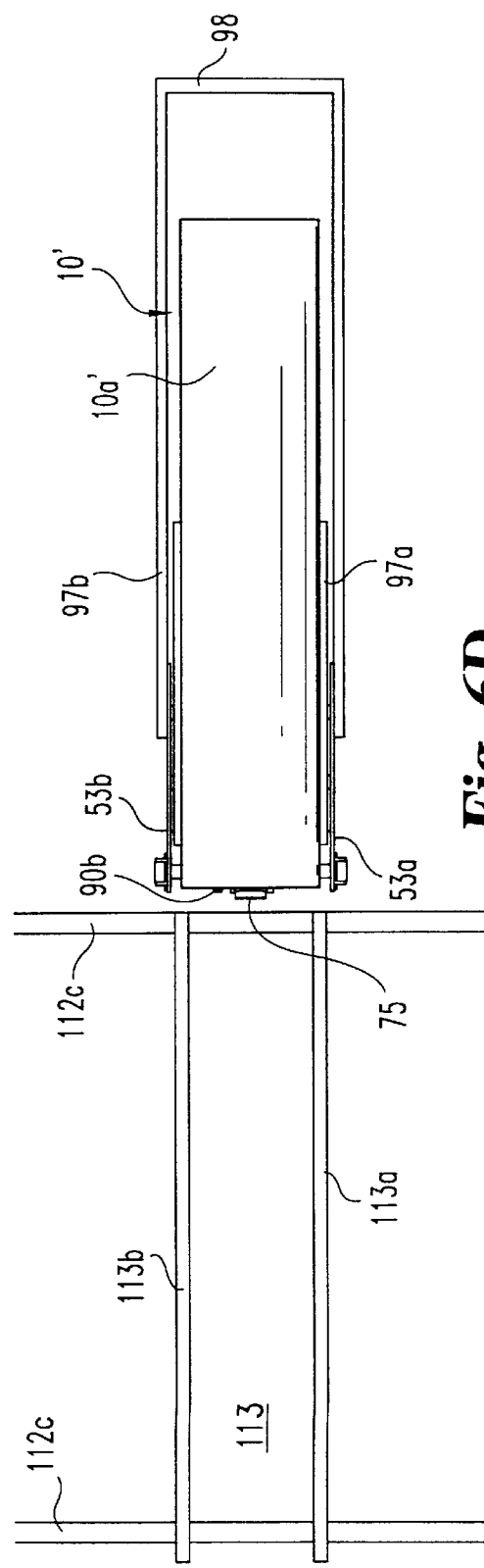

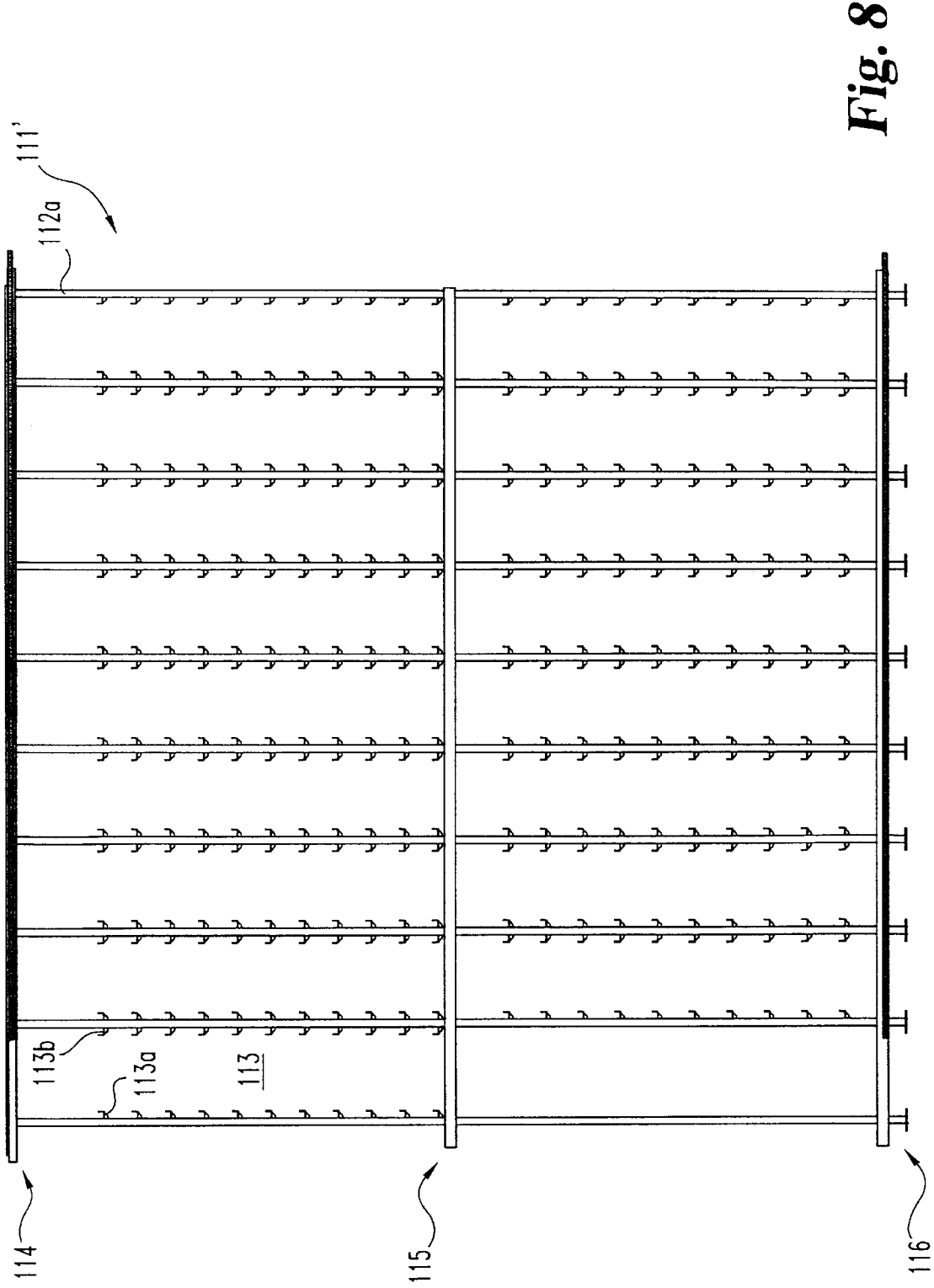

AUTOMATED ROTARY DIE STORAGE AND RETRIEVAL UNIT WITH COMPLEMENTARY ROTARY DIE STORAGE RACK AND COMPLEMENTARY ROTARY DIE STORAGE CART

BACKGROUND OF THE INVENTIONS

1. Field of the Inventions

The present inventions relate to the field of material or article handling systems. More particularly, the present inventions relate to a system and a method for an automated storage and retrieval of rotary dies.

2. Background Art

FIG. 1 is an illustration of a rotary die storage rack 11 for a manual storage and retrieval of a plurality of rotary dies 10. Each rotary die 10 includes an elongated semi-circular body 10a, and a plurality of cutting blades (not shown) mounted to and upwardly extended from a convex surface of body 10a. Rotary die storage rack 11 includes a frame 12, and a plurality of rotary die shelves 13 disposed within and mounted to frame 12. Rotary die shelves 13 form a grid consisting of five (5) horizontal rows and five (5) vertical columns of rotary die shelves 13. Each rotary die shelf 13 is defined by a left angle iron 13a and a right angle iron 13b. The bodies 10a of each stored rotary die 10 have a left longitudinal edge placed upon left angle iron 13a, and a right longitudinal edge placed upon right angle iron 13b. Alternatively, each rotary die shelf 13 can include a board 13c placed upon left angle iron 13a and right angle iron 13b, and the left longitudinal edge and the right longitudinal edge of a body 10a of a rotary die 10 can be placed upon board 13c. Utilization of board 13c enables two or more rotary dies 10 having dissimilar radiuses to be placed upon board 13c.

Prior to the advent of rotary die storage rack 11, the typical storing procedures for rotary dies 10 were to either stand rotary dies 10 on the floor or hang rotary dies 10 from hooks There are several advantages of rotary die storage rack 11 over these aforementioned storing procedures. First, a risk of structural damage to a stored rotary die 10 is reduced when the stored rotary die 10 is being supported by a rotary die shelf 13. Second, a risk of a personal injury to personnel during a storage of rotary dies 10, particularly a risk of being cut by a cutting blade of a stored rotary die 10, is also reduced when rotary dies 10 are being supported by rotary die shelves 13. Finally, rotary die storage rack 11 is a more efficient use of floor space.

A major disadvantage of rotary die storage rack 11 is a number of horizontal rows of rotary die shelves 13 is dictated by a maximum height of a horizontal row of rotary die shelves 13 in which a person can easily and safely manually store and retrieve a rotary die 10. As such, in situations requiring additional rotary die shelves 13 for a storage of extra rotary dies 10, rotary die storage rack 11 can only be laterally expanded to include additional vertical columns of rotary die shelves 13, or an additional rotary die storage rack 11 would have to be made or purchased. However, the appropriation of additional floor space for the additional vertical columns of rotary die shelves 13 or for an additional rotary die storage rack 11 may not be feasible or desirable.

SUMMARY OF THE INVENTION

The present inventions are an automated rotary die storage and retrieval unit, a rotary die storage rack, a rotary die storage cart, an automated rotary die storage and retrieval system, and an automated rotary die storage and retrieval method. The present inventions overcome the aforementioned drawback associated with rotary die storage rack 11 (FIG. 1). Various aspects of the present inventions are novel, non-obvious, and provide various advantages. While the actual nature of the present inventions described in detail herein can only be determined with reference to the claims appended hereto, certain features which are characteristic of the present inventions disclosed herein can be described briefly.

As shown in the following description of the preferred embodiments, a rotary die storage and retrieval unit comprises a frame movably mountable to a rotary die storage rack, and a shuttle capable of supporting a rotary die. The rotary die storage rack comprises a plurality of rotary die shelves disposed within the rotary die storage rack and accessible through a side opening of the rotary die storage rack. The shelves are either adjoined to a frame of the rotary die storage rack, or adjoined to a pair of frames of a rotary die storage cart disposed within any embodiment of the rotary die storage rack capable of housing the rotary die storage cart. When the frame of the rotary die storage and retrieval unit is movably mounted to the rotary die storage rack, the frame is adjacent the side opening of the rotary die storage rack. The rotary die storage and retrieval unit further comprises a frame driver that is operable to align the frame with a vertical column containing a desired rotary die shelf upon which to store or retrieve a rotary die. The rotary die storage and retrieval unit further comprises a carriage movably adjoined to the frame, and a carriage driver that is operable to align the carriage with a horizontal row containing the desired rotary die shelf. The shuttle is movably adjoined to the carriage, and upon an alignment of the frame and the carriage with the rotary die shelf, the shuttle is extendable into and retractable out of the side opening of the rotary die storage rack. The rotary die storage and retrieval unit further comprises a shuttle driver to extend the shuttle or a portion thereof into the side opening of the rotary die storage rack, and to retract the extended shuttle or the extended portion thereof from within the side opening of the rotary die storage rack. As a result, when the shuttle or a portion thereof is extended into the side opening of the rotary die storage rack, a rotary die to be stored can be displaced from the shuttle and disposed upon the rotary die shelf, and a rotary die to be retrieved can be displaced from the rotary die shelf and disposed upon the shuttle.

It is a primary objective of the present inventions to reduce the risks associated with a manual storage and retrieval of rotary dies.

It is another primary objective of the present inventions to more efficiently utilize available floor space for the storage of a plurality of rotary dies.

These and other objectives and advantages of the present inventions will become more apparent from a review of the following description of the preferred embodiments of the present inventions.

BRIEF DESCRIPTION OF THE DRAWINGS

FIG. 1 is a front perspective view of a rotary die being manually stored onto a conventional rotary die storage rack supporting a plurality of rotary dies.

FIG. 3A is a front view of one embodiment of a rotary die storage rack in accordance with the present inventions.

FIG. 4A is a front view of one embodiment of an automated rotary die storage and retrieval system in accordance with the present inventions.

FIGS. 5A–5F are plan views of a first exemplary illustration of a storage and a retrieval of a rotary die in accordance with the present inventions.

FIGS. 6A–6D are plan views of a second exemplary illustration of a storage and a retrieval of a rotary die in accordance with the present inventions.

FIG. 8 is a front view of another embodiment of a rotary die storage rack in accordance with the present inventions.

DESCRIPTION OF THE PREFERRED EMBODIMENTS

Figure 2A:
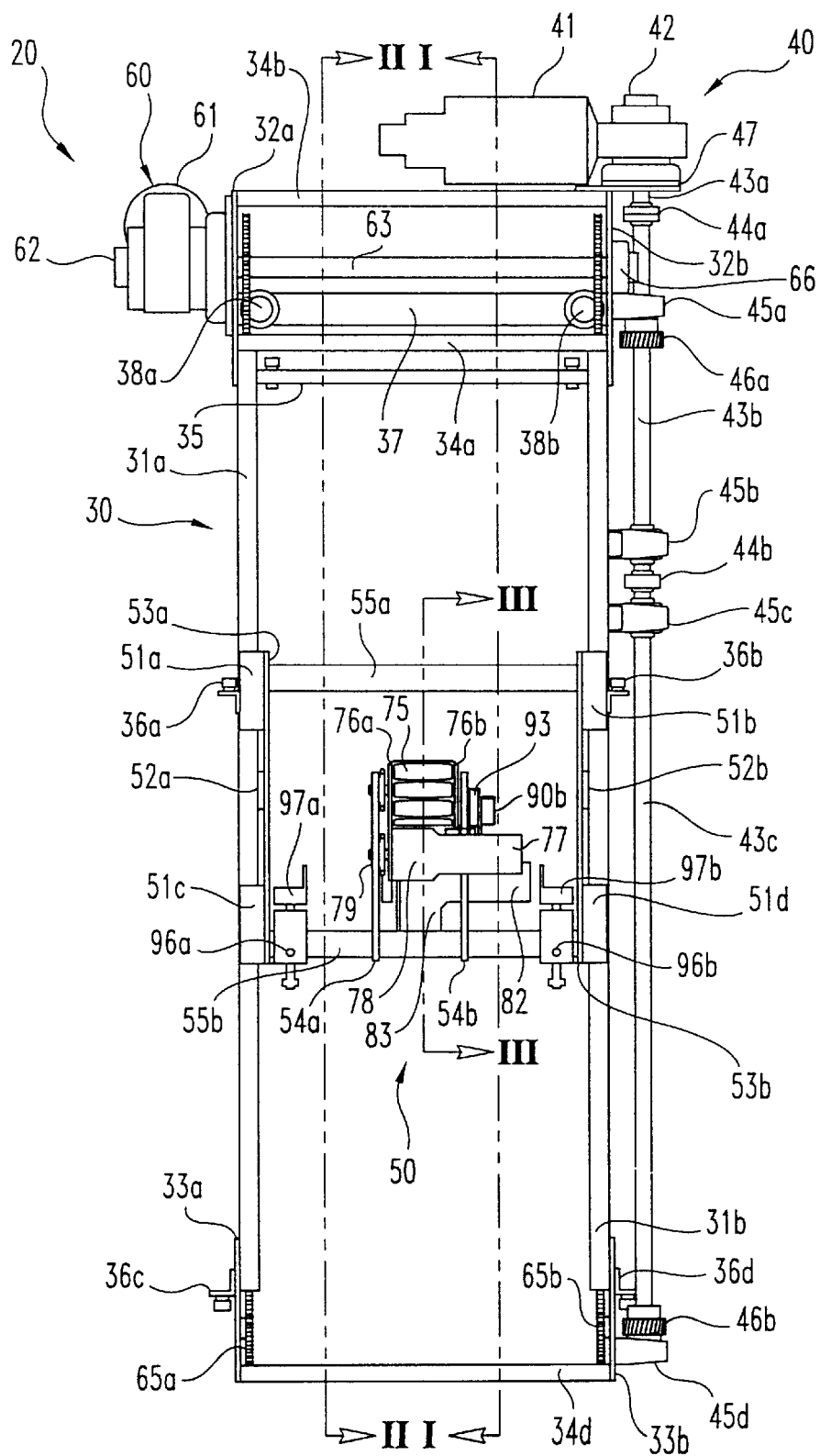
FIG. 2A is a front view of one embodiment of an automated rotary die storage and retrieval unit in accordance with the present inventions.

For the purposes of promoting an understanding of the principles of the present inventions, reference will now be made to the preferred embodiments of the present inventions as illustrated in the drawings and specific language will be used to describe the same. It will nevertheless be understood that no limitation of the scope of the present inventions is thereby intended. Any alterations and further modifications in the illustrated embodiments, and any further applications of the principles of the present inventions as illustrated herein are contemplated as would normally occur to one skilled in the art to which the present inventions relates. While rotary dies 10 (FIG. 1) will be shown in the illustrations of the present inventions and described in the accompanying text, the present inventions contemplate storing and retrieving rotary dies having a configuration other than an elongated semi-circular body. The term adjoined as used herein is broadly defined as a unitary fabrication, an affixation, a detachable coupling, an engagement, and/or an abutment of two or more manufactured articles.

Figure 2B:
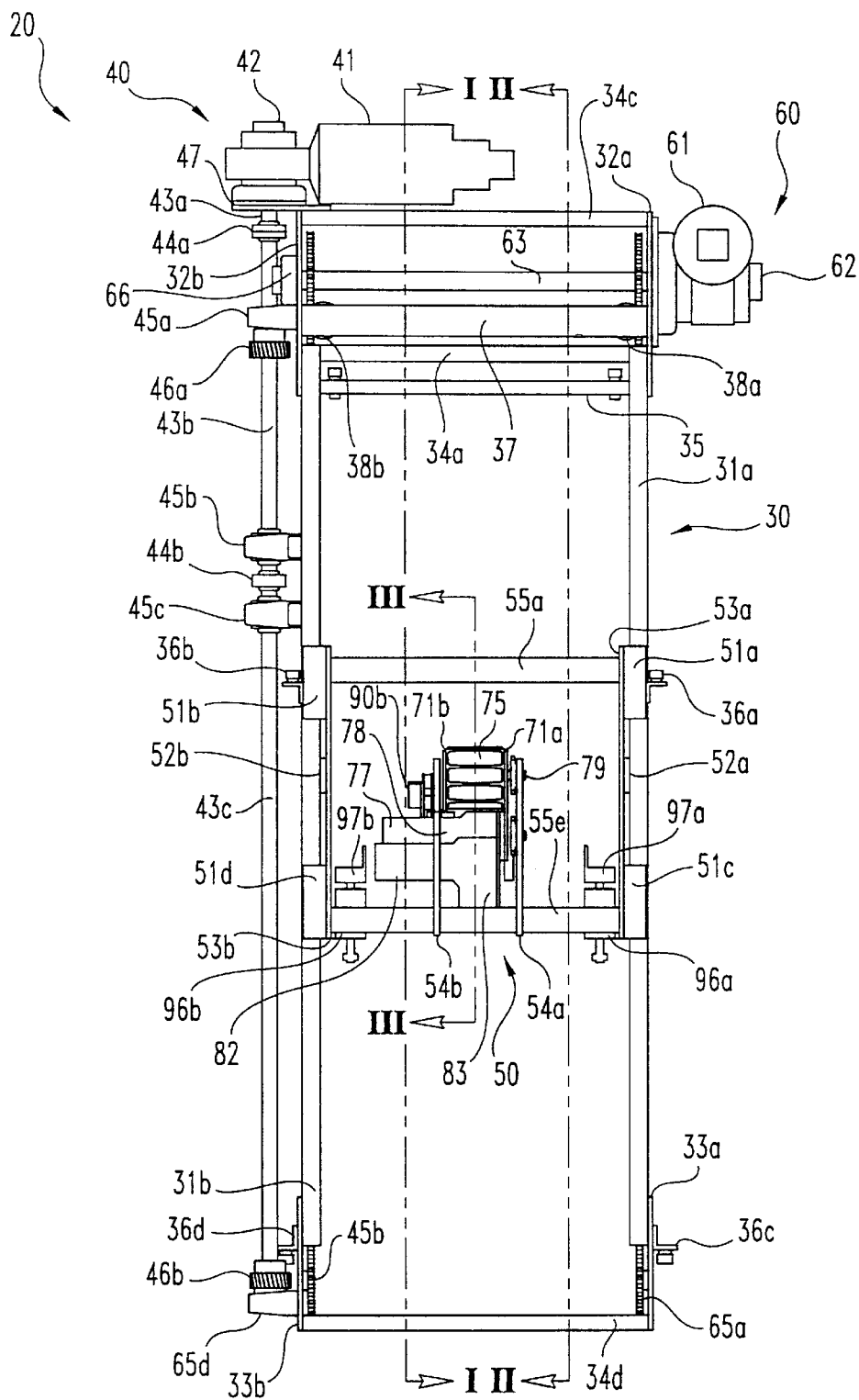
FIG. 2B is a rear view of the automated rotary die storage and retrieval unit of FIG. 2A.
Figure 2C:
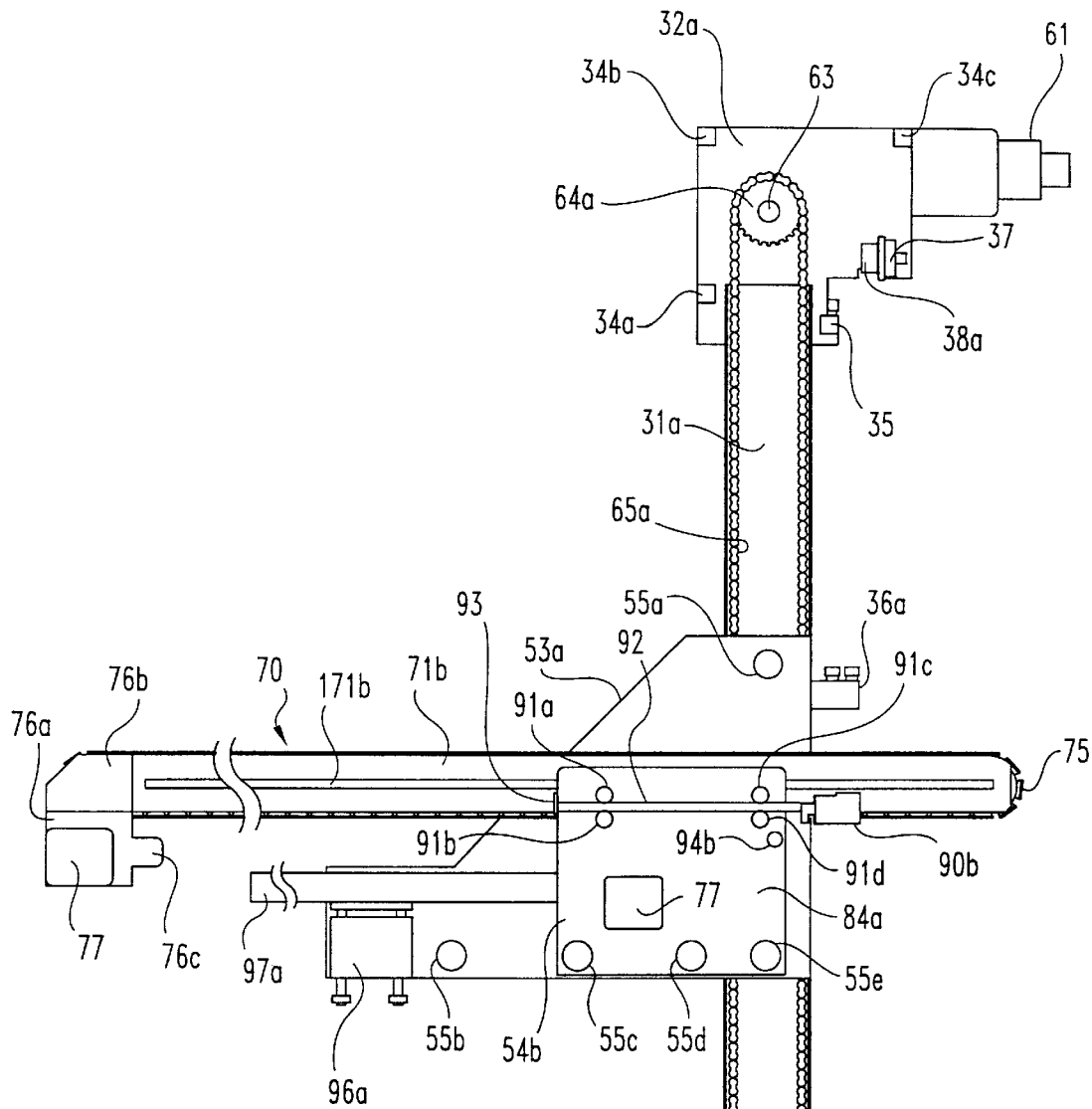
FIG. 2C is a cross-sectional view of the automated rotary die storage and retrieval unit of FIG. 2A taken across a section I—I in FIG. 2A.
Figure 2D:
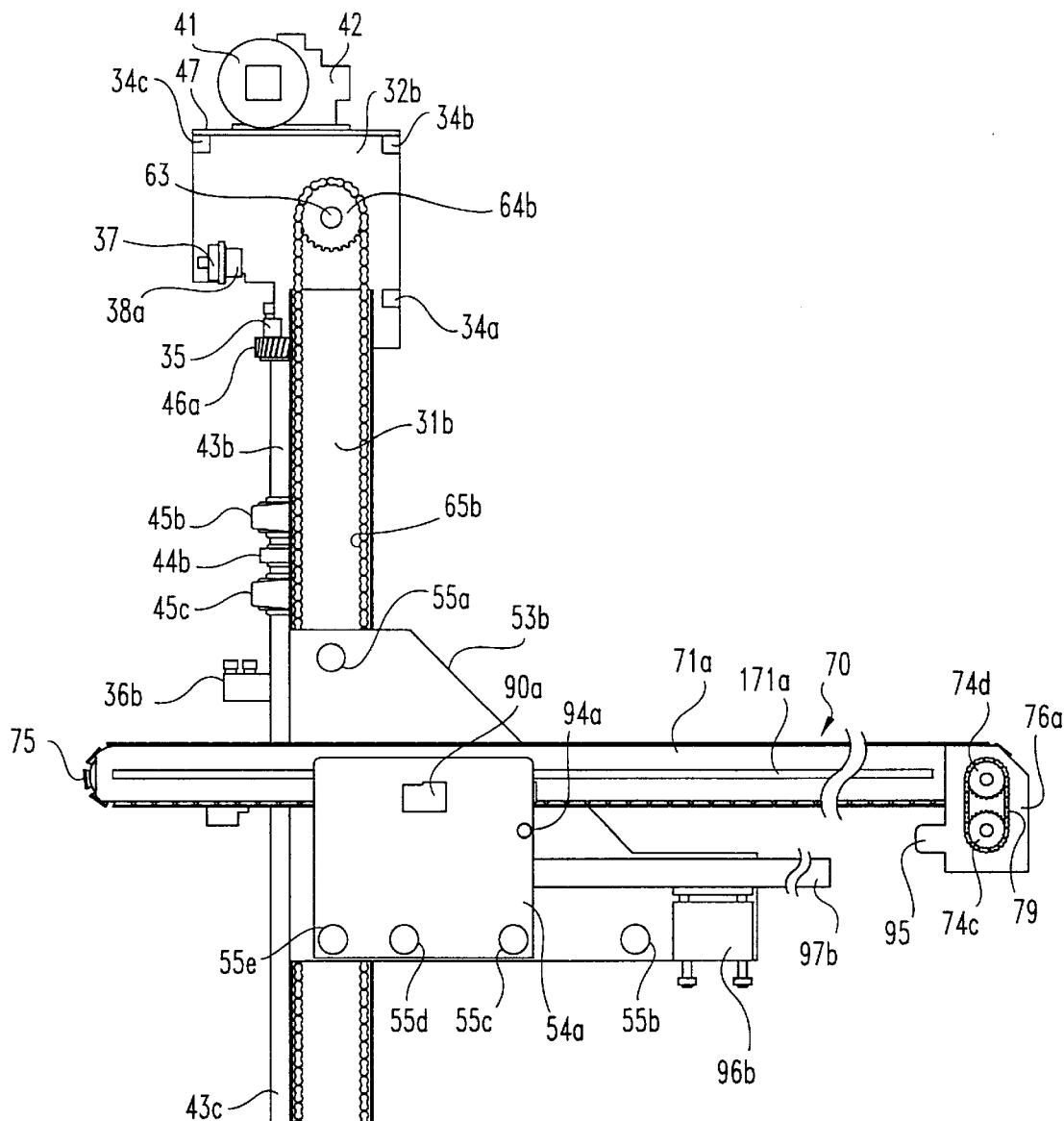
FIG. 2D is a cross-sectional view of the automated rotary die storage and retrieval unit of FIG. 2A taken across a section II—II in FIG. 2A.

FIGS. 2A–2E are views of the various components of a rotary die storage and retrieval unit 20 in accordance with a preferred embodiment of the present inventions, and therefore the illustrations and accompanying description herein of rotary die storage and retrieval unit 20 is given solely for purposes of describing the best mode of the present inventions and is not meant to be limiting as to the scope of a claimed rotary die storage and retrieval unit in any way. Referring to FIGS. 2A–2D, rotary die storage and retrieval unit 20 comprises a frame 30. Frame 30 includes a left U-shaped carriage track 31a, and a right U-shaped carriage track 31b. Carriage track 3 1a and carriage track 31b are vertically disposed. Preferably, carriage track 31a and carriage track 31b are symmetrically configured, dimensioned, and aligned. A channel of carriage track 31a as best shown in FIG. 2C spatially faces a channel of carriage track 31b as best shown in FIG. 2D.

Frame 30 further includes a left drive plate 32a, a right drive plate 32b, a left sprocket plate 33a, and a right sprocket plate 33b. A lower end of an inner side surface of drive plate 32a is parallelly adjoined to (preferably detachably coupled to) an upper end of a base side surface of carriage track 31a as best shown in FIG. 2C. A lower end of an inner side surface of drive plate 32b is parallelly adjoined to (preferably detachably coupled to) an upper end of a base side surface of carriage track 31b as best shown in FIG. 2D. An upper end of an inner side surface of sprocket plate 33a is parallelly adjoined to (preferably detachably coupled to) a lower end of the base side surface of carriage track 31a as best shown in FIG. 2C. An upper end of an inner side surface of sprocket plate 33b is parallelly adjoined to (preferably detachably coupled to) a lower end of the base side surface of carriage track 31b as best shown in FIG. 2D.

Frame 30 further includes a first upper spacer tube 34a, a second upper spacer tube 34b, a third upper spacer tube 34c, and a lower spacer tube 34d to fix the spatial facing of the channel of carriage track 31a and the channel of carriage track 31b. A left end of spacer tube 34a is perpendicularly adjoined to (preferably detachably coupled to) the lower end of the inner side surface of drive plate 32a, and a right end of spacer tube 34a is perpendicularly adjoined to (preferably detachably coupled to) the lower end of the inner side surface of drive plate 32b. Carriage track 31a is aft the left end of spacer tube 34a as best shown in FIG. 2C, and carriage track 31b is aft the right end of spacer tube 34a as best shown in FIG. 2D. A left end of spacer tube 34b is perpendicularly adjoined to (preferably detachably coupled to) an upper end of the inner side surface of drive plate 32a, and a right end of spacer tube 34b is perpendicularly adjoined to (preferably detachably coupled to) an upper end of the inner side surface of drive plate 32b. Spacer tube 34b is vertically aligned with spacer tube 34a as best shown in FIGS. 2C and 2D. A left end of spacer tube 34c is perpendicularly adjoined to (preferably detachably coupled to) the upper end of the inner side surface of drive plate 32a, and a right end of spacer tube 34c is perpendicularly adjoined to (preferably detachably coupled to) the upper end of the inner side surface of drive plate 32b. Spacer tube 34c is horizontally aligned with and aft of spacer tube 34b as best shown in FIGS. 2C and 2D. A left end of spacer tube 34d is perpendicularly adjoined to (preferably detachably coupled to) a lower end of the inner side surface of sprocket plate 33a, and a right end of spacer tube 34d is perpendicularly adjoined to (preferably detachably coupled to) a lower end of the inner side surface of sprocket plate 33b. The left end of spacer tube 34d is vertically aligned with carriage track 31a as best shown in FIG. 2C, and the right end of spacer tube 34d is vertically aligned with carriage track 31b as best shown in FIG. 2D.

Figure 4B:
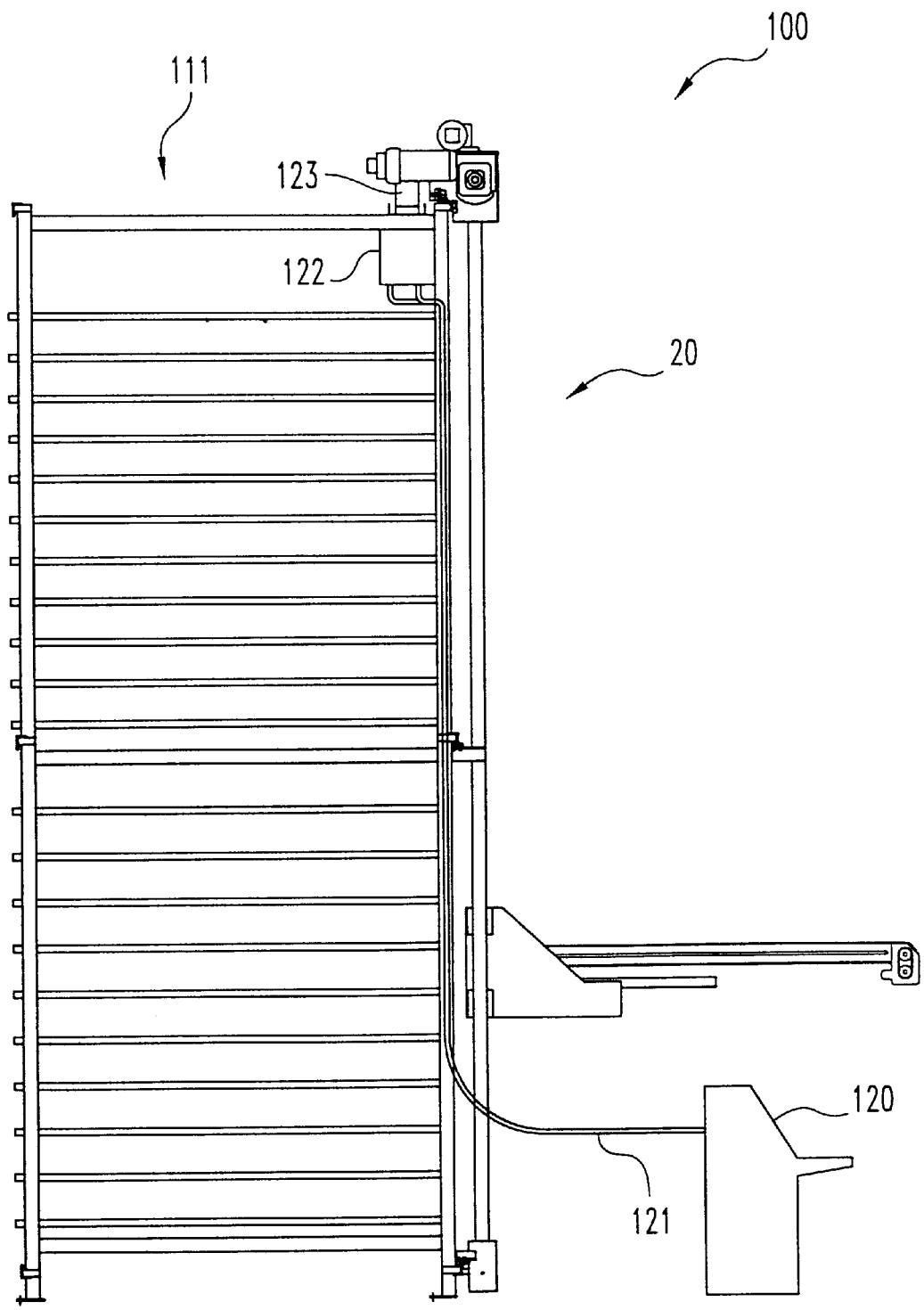
FIG. 4B is a left side surface view of the automated storage and retrieval system of FIG. 4A.

Frame 30 further includes an upper cam follower 35, a left middle cam follower 36a, a right middle cam follower 36b, a lower left cam follower 36c, a lower right cam follower 36d, a support bar 37, an upper left wheel 38a, and an upper right wheel 38b to movably mount frame 30 to a rotary die storage rack in accordance with the present inventions whereby frame 30 can de displaced along the rotary die storage rack as further illustrated herein in connection with FIGS. 4A and 4B, and described herein in an accompanying text. A left end of cam follower 35 is perpendicularly adjoined to (preferably detachably coupled to) the lower end of the inner side surface of drive plate 32a, a right end of cam follower 35 is perpendicularly adjoined to (preferably detachably coupled to) the lower end of the inner side surface of drive plate 32b, and a pair of cam wheels of cam follower 35 are extended upward therebetween. The left end of cam follower 35 is aft carriage track 31a as best shown in FIG. 2C, and the right end of cam follower 35 is aft carriage track 31b as best shown in FIG. 2D. Cam follower 36a is parallelly adjoined to (preferably detachably coupled to) a middle section of the base side surface of carriage track 31a. A pair of cam wheels of cam follower 36a extend upward, and are aft carriage track 31a as best shown in FIG. 2C. Cam follower 36b is parallelly adjoined to (preferably detachably coupled to) a middle section of the base side surface of carriage track 31b. A pair of cam wheels of cam follower 36b extend upward, are aft carriage track 31b as best shown in FIG. 2D, and are horizontally aligned with the cam wheels of cam follower 36a. Cam follower 36c is parallelly adjoined to (preferably detachably coupled to) the upper end of an outer side surface of sprocket plate 33a. A pair of cam wheels of cam follower 36c extend downward, are aft carriage track 31a, and are vertically aligned with the cam wheels of cam follower 36a as best shown in FIG. 2C. Cam follower 36d is parallelly adjoined to (preferably detachably coupled to) an upper end of an outer side surface of sprocket plate 33b. A pair of cam wheels of cam follower 36d extend downward, are aft carriage track 31b, are vertically aligned with the cam wheels of cam follower 36b as best shown in FIG. 2D, and are horizontally aligned with the cam wheels of cam follower 36c. A left end of support bar 37 is perpendicularly adjoined to (preferably detachably coupled to) a middle section of the inner side surface of drive plate 32a, and a right end of support bar 37 is perpendicularly adjoined to (preferably detachably coupled to) a middle section of the inner side surface of drive plate 32b. The left end of support bar 37 is aft and higher than the left end of cam follower 35 as best shown in FIG. 2C, and the right end of support bar 37 is aft and higher than the right end of cam follower 35 as best shown in FIG. 2D. Wheel 38a is rotatably mounted to a front side surface of support bar 37 adjacent the left end of support bar 37, and longitudinally extended therefrom as best shown in FIG. 2C. Wheel 38b is rotatably mounted to the front side surface of support bar 37 adjacent the right end of support bar 37, and longitudinally extended therefrom as best shown in FIG. 2D.

Still referring to FIGS. 2A–2D, rotary die storage and retrieval unit 20 further comprises a frame driver 40 adjoined to frame 30. For purposes of the present inventions, a frame driver is defined as an assemblage of manufactured articles that is operable to transmit a translational force to a frame of a rotary die storage and retrieval unit in accordance with the present inventions to thereby displace the frame. For the illustrated embodiments of the present inventions, frame driver 40 is an assemblage of manufactured articles that is operable to transmit a translational force to frame 30 to thereby displace frame 30 in either a right direction or a left direction along a rotary die storage rack in accordance with the present inventions as further illustrated herein in connection with FIGS. 4A, 4B, and 9, and described herein in accompanying text. Frame driver 40 includes a motor 41, a reducer 42, a mount plate 47, an upper control shaft 43a, a middle control shaft 43b, a lower control shaft 43c, an upper coupling 44a, and a middle coupling 44b. A left end of a bottom side surface of mount plate 47 is perpendicularly adjoined (preferably detachably coupled to) an upper edge of drive plate 32b, a top side surface of spacer tube 34b, and a top side surface of spacer tube 34c. A housing of reducer 42 is adjoined to (preferably detachably coupled to) a housing of motor 41, and adjoined to (preferably detachable coupled to) a right end of a top side surface of mount plate 47. Motor 41 includes a drive rod (not shown) within its housing that is rotatable in a clockwise direction and in a counterclockwise direction. The drive rod of motor 41 is extended within the housing of reducer 42, and rotatably adjoined to (preferably detachably coupled to) reducer 42. An upper end of control shaft 43a is extended within the housing of reducer 42, and also rotatably adjoined to (preferably detachably coupled to) reducer 42 to thereby rotate about its longitudinal axis in unison with a rotation of the drive rod of motor 41. A lower end of control shaft 43a, and an upper end of control shaft 43b are rotatably adjoined to (preferably detachably coupled to) coupling 44a, and a lower end of control shaft 43b and an upper end of control shaft 43c are rotatably adjoined to (preferably detachably coupled to) coupling 44b. Thus, control shaft 43b and control shaft 43c rotate about their respective longitudinal axes in unison with the unified rotation of the drive rod of motor 41 and control shaft 43a.

Frame driver 40 further includes an upper bearing 45a, a first middle bearing 45b, a second middle bearing 45c, and a lower bearing 45d. Bearing 45a is adjoined to (preferably detachably coupled to) a middle section of an outer side surface of drive plate 32b. A middle section of control shaft 43b is rotatably extended through and engaged with bearing 45a. Bearing 45b and bearing 45c are adjoined to (preferably detachably coupled to) the middle section of the base side surface of carriage track 31b. The lower end of control shaft 43b is rotatably extended through and engaged with bearing 45b, and the upper end of control shaft 43c is rotatably extended through and engaged with bearing 45c. Bearing 45d is adjoined to (preferably detachably coupled to) a lower end of the outer side surface of sprocket plate 33b. A lower end of control shaft 43c is rotatably extended within and engaged to bearing 45d.

Frame driver 40 further includes an upper spur gear 46a, and a lower spur gear 46b. Spur gear 46a is adjoined to (preferably detachably coupled to) the middle section of control shaft 43b, and spur gear 46b is adjoined to (preferably detachably coupled to) the lower end of control shaft 43c to concurrently rotate with control shaft 43a, control shaft 43b, and control shaft 43c about their respective longitudinal axes. The drive rod of motor 41 is operable to transmit a rotational force to spur gear 46a and spur gear 46b via reducer 42, control shaft 43a, control shaft 43b, and control shaft 43c to thereby rotate spur gear 46a and spur gear 46b in either a clockwise direction or a counterclockwise direction whereby a translational force is transmitted to frame 30 when spur gear 46a and spur gear 46b are rotatably adjoined to a rotary die storage rack in accordance with the present inventions as further illustrated herein in connection with FIGS. 4A, 4B, and 9, and described herein in an accompanying text. Reducer 42 includes an encoder (not shown) that is operable to transmit a signal as an indication of a degree and direction of the rotational force transmitted to spur gear 46a and spur gear 46b by the drive rod of motor 41 whereby a position of frame 30 as related to a side opening of a rotary die storage rack in accordance with the present inventions can be ascertained as further illustrated herein in connection with FIGS. 4A and 4B, and described herein in an accompanying text.

Referring to FIGS 2A–2E, rotary die storage and retrieval unit 20 further comprises a carriage 50 movably adjoined to frame 30 whereby carriage 50 is displaceable along frame 30 in either an upward direction or in a downward direction. Carriage 50 includes a left upper slider 51a, a right upper slider 51b, a left lower slider 51c, a right lower slider 51d, a left anchor chain 52a, a right anchor chain 52b, a left lift plate 53a, and a right lift plate 53b. Slider 51a is movably mounted to carriage track 31a, slider 51b is movably mounted to carriage track 31b, slider 51c is movably mounted to carriage track 31a, and slider 51d is movably mounted to carriage track 31b. Anchor chain 52a is slidably disposed within the channel of carriage track 31a, and anchor chain 52b is slidably disposed within the channel of carriage track 31b. Lift plate 53a and lift plate 53b are vertically disposed. Preferably, lift plate 53a and lift plate 53b are symmetrically configured, dimensioned, and aligned. Slider 51a is adjoined to (preferably detachably coupled to) an upper end of an outer side surface of lift plate 53a, anchor chain 52a is adjoined to (preferably detachably coupled to) a middle section of the outer side surface of lift plate 53a, and slider 51c is adjoined to (preferably detachably coupled to) a lower end of the outer side surface of lift plate 53a. Slider 51b is adjoined to (preferably detachably coupled to) an upper end of an outer side surface of lift plate 53b, anchor chain 52b is adjoined to (preferably detachably coupled to) a middle section of the outer side surface of lift plate 53b, and slider 51d is adjoined to (preferably detachably coupled to) a lower end of the outer side surface of lift plate 53b.

Carriage 50 further includes a left carrier plate 54a, a right carrier plate 54b, an upper spacer tube 55a, a first lower spacer tube 55b, a second lower spacer tube 55c, a third lower spacer tube 55d, and a fourth lower spacer tube 55e. A left end of spacer tube 55a is perpendicularly adjoined to (preferably detachably coupled to) a rear upper end of an inner side surface of lift plate 53a, and a right end of spacer tube 55a is perpendicularly adjoined to (preferably detachably coupled to) a rear upper end of an inner side surface of lift plate 53b. A left end of spacer tube 55b is perpendicularly adjoined to (preferably detachably coupled to) a front lower end of the inner side surface of lift plate 53a, and a right end of spacer tube 55b is perpendicularly adjoined to (preferably detachably coupled to) a front lower end of the inner side surface of lift plate 53b. Carrier plate 54a and carrier plate 54b are vertical disposed between lift plate 53a and lift plate 53b. Preferably, carrier plate 54a and carrier plate 54b are symmetrically configured, dimensioned, and aligned. A left end of spacer tube 55c is perpendicularly adjoined to (preferably detachably coupled to) a middle section of the lower end of the inner side surface of lift plate 53a, a middle section of spacer tube 55c is extended through a front lower end of carrier plate 54a and through a front lower end of carrier plate 54b, and the right end of spacer tube 55c is perpendicularly adjoined to (preferably detachably coupled to) a middle section of the lower end of the inner side surface of lift plate 53b. A left end of spacer tube 55d is perpendicularly adjoined to (preferably detachably coupled to) the middle section of the lower end of the inner side surface of lift plate 53a, a middle section of spacer tube 55d is extended through a middle section of the lower end of carrier plate 54a and through a middle section of the lower end of carrier plate 54b, and a right end of spacer tube 55d is perpendicularly adjoined to (preferably detachably coupled to) the lower end of the inner side surface of lift plate 53b. A left end of spacer tube 55e is perpendicularly adjoined to (preferably detachably coupled to) a rear lower end of the inner side surface of lift plate 53a, a middle section of spacer tube 55e is extended through a rear lower end of carrier plate 54a and through a rear lower end of carrier plate 54b, and a right end of spacer tube 55e is perpendicularly adjoined to (preferably detachably coupled to) a rear lower end of the inner side surface of lift plate 53b. Spacer tube 55d is aft of spacer tube 55c, and spacer tube 55e is aft of spacer tube 55d. Spacer tube 55b, spacer tube 55c, spacer tube 55d, and spacer tube 55e are horizontally aligned.

Figure 2E:
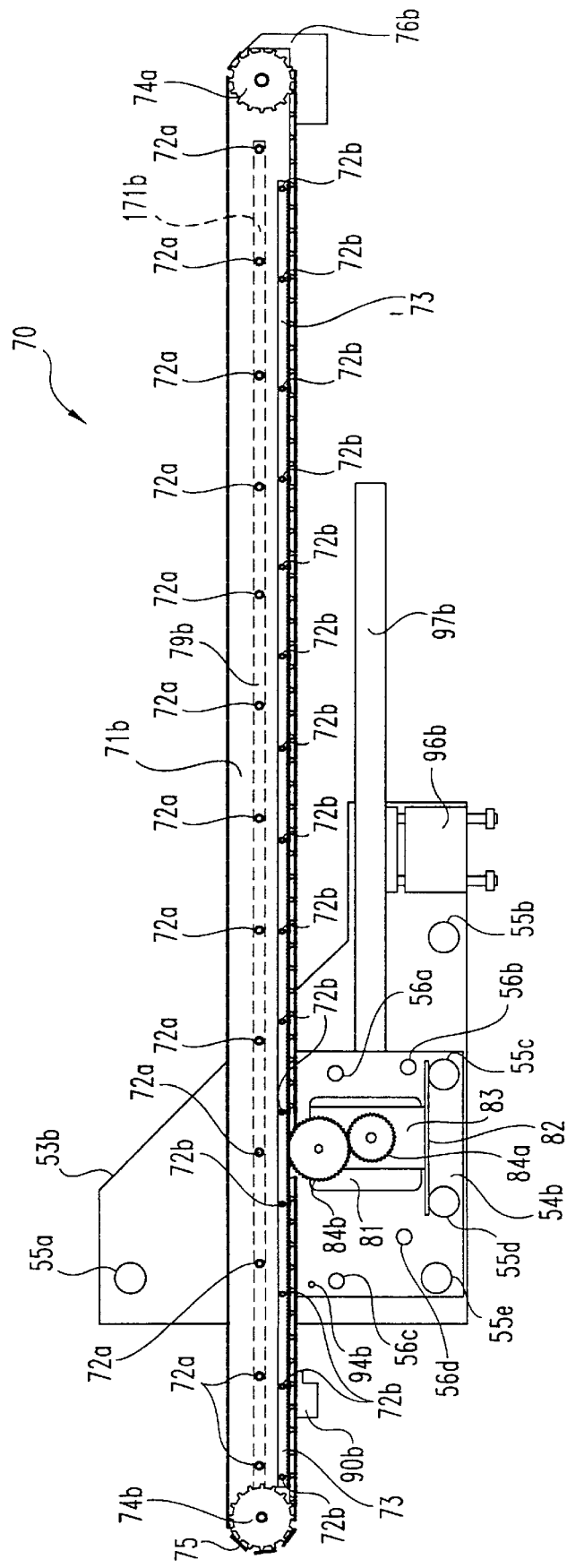
FIG. 2E is a cross-sectional view of a shuttle and a shuttle driver of the automated rotary die storage and retrieval unit of FIG. 2A taken across a section III—III in FIG. 2A.

Carriage 50 further includes a front upper spacer bar 56a, a front lower spacer bar 56b, a rear upper spacer bar 56c, and a rear lower space bar 56d. A left end of spacer bar 56a is perpendicularly adjoined to (preferably detachably coupled to) a front upper end of an inner side surface of carrier plate 54a, and a right end of spacer bar 56a is perpendicularly adjoined to (preferably detachably coupled to) a front upper end of an inner side surface of carrier plate 54b. A left end of spacer bar 56b is perpendicularly adjoined to (preferably detachably coupled to) a front lower end of the inner side surface of carrier plate 54a, and a right end of spacer bar 56b is perpendicularly adjoined to (preferably detachably coupled to) a front lower end of the inner side surface of carrier plate 54b. Spacer bar 56a and spacer bar 56b are horizontally aligned as best shown in FIG. 2E. A left end of spacer bar 56c is perpendicularly adjoined to (preferably detachably coupled to) a rear upper end of the inner side surface of carrier plate 54a, and a right end of spacer bar 56c is perpendicularly adjoined to (preferably detachably coupled to) a rear upper end of the inner side surface of carrier plate 54b. A left end of spacer bar 56d is perpendicularly adjoined to (preferably detachably coupled to) a rear lower end of the inner side surface of carrier plate 54a, and a right end of spacer bar 56d is perpendicularly adjoined to (preferably detachably coupled to) a rear lower end of the inner side surface of carrier plate 54b. Spacer bar 56c is aft of spacer bar 56d as best shown in FIG. 2E.

Referring again to FIGS. 2A–2D, rotary die storage and retrieval unit 20 further comprises a carriage driver 60 adjoined to carriage 50. For purposes of the present inventions, a carriage driver is defined as an assemblage of articles that is operable to transmit a translational force to a carriage of a rotary die storage and retrieval unit in accordance with the present inventions to thereby displace the carriage. For the illustrated embodiments of the present inventions, carriage driver 60 is an assemblage of manufactured articles that is operable to transmit a translational force to carriage 50 to thereby displace carriage 50 along frame 30 in either an upward direction or in a downward direction. Carriage driver 60 includes a motor 61, a reducer 62, a control shaft 63, and a bearing 66. A housing of reducer 62 is adjoined to (preferably detachably coupled to) a housing of motor 61, and a middle section of an outer side surface of drive plate 32a. Motor 61 includes a drive rod (not shown) that is rotatable in a clockwise direction and in a counterclockwise direction. The drive rod of motor 61 is extended within the housing of reducer 62 and rotatably adjoined to (preferably detachably coupled to) reducer 62. A left end of control shaft 63 is rotatably extended through the middle section of drive plate 32a. The left end of control shaft 63 is also extended within the housing of reducer 62 and rotatably adjoined to (preferably detachably coupled to) reducer 62 to thereby rotate about its longitudinal axis in unison with the driver rod of motor 61. Bearing 66 is adjoined to (preferably detachably coupled to) a middle section of an outer side surface of drive plate 32b. A right end of control shaft 63 is rotatably extended through the middle section of drive plate 32b, and bearing 66. Control shaft 63 is vertically aligned with carriage track 31a as best shown in FIG. 2C and carriage track 31b as best shown in FIG. 2D.

Carriage driver 60 further includes an upper left sprocket 64a, an upper right sprocket 64b, a lower left sprocket 64c, a lower right sprocket 64d, left chain 65a, and right chain 65b. Sprocket 64a is adjoined to (preferably detachably coupled to) control shaft 63 adjacent the left end thereof as best shown in FIG. 2C to thereby rotate in unison with a rotation of control shaft 63. Sprocket 64c is rotatably adjoined to (preferably detachably coupled to) a middle section of the inner side surface of sprocket plate 33a, and is vertically aligned with sprocket 64a as best shown in FIG. 2C. Chain 65a is engaged with sprocket 64a and sprocket 64c, and extended throughout the U-shaped channel of carriage track 31a as best shown in FIG. 2C. Sprocket 64b is adjoined to (preferably detachably coupled to) control shaft 63 adjacent the right end thereof as best shown in FIG. 2D to thereby rotate in unison with a unified rotation of control shaft 63 and sprocket 64a. Sprocket 64d is rotatably adjoined to (preferably detachably coupled to) a middle section of the inner side surface of sprocket plate 33b, and is vertically aligned with sprocket 64b as best shown in FIG. 2D. Chain 65b is engaged with sprocket 64b and sprocket 64d, and extended throughout the U-shaped channel of carriage track 31b as best shown in FIG. 2D. The drive rod of motor 61 is operable to transmit a rotational force to chain 65a via control shaft 63, sprocket 64a, and sprocket 64c, and to transmit the rotational force to chain 65b via control shaft 63, sprocket 64b, and sprocket 64d to thereby rotate chain 65a and chain 65b in either a clockwise direction or a counterclockwise direction whereby a translational force in either an upward direction or a downward direction is transmitted to carriage 50. Reducer 62 includes an encoder (not shown) that is operable to transmit a signal as an indication of a degree and a direction of the rotational force transmitted to chain 65a and chain 65b whereby a position of a carriage 50 as related to frame 30 can be ascertained.

Referring to FIGS. 2A–2E, rotary die storage and retrieval unit 20 further comprises a shuttle 70. Shuttle 70 includes a left U-shaped shuttle track 71a, a right U-shaped shuttle track 71b, a guide rail 171a, and a guide rail 171b. A left side surface of guide rail 171a is adjoined to (preferably affixed to) a middle section of a base side surface of shuttle track 71a between a front end and a rear end of shuttle track 71a. A top side surface and a bottom side surface of guide rail 171a engage a plurality of pairs of cam wheels (not shown) rotatably adjoined to an upper end of the inner side surface of carrier plate 54a whereby shuttle track 71a is movably mounted to carrier plate 54a. A right side surface of guide rail 171b is adjoined to (preferably affixed to) a middle section of a base side surface of shuttle track 71b between a front end and a rear end of shuttle track 71b. A top side surface and a bottom side surface of guide rail 171b engage a plurality of pairs of cam wheels (not shown) rotatably adjoined to an upper end of the inner side surface of carrier plate 54b whereby shuttle track 71b is movably mounted to carrier plate 54b. Preferably, shuttle track 71a and shuttle track 71b are symmetrically configured, dimensioned, and aligned. A channel of shuttle track 71a spatially faces a channel of shuttle track 71b.

Shuttle 70 further includes a plurality of upper spacer tubes 72a to fix the spatial facing of the channel of shuttle track 71a and the channel of shuttle track 71b. The left ends of spacer tubes 72a are perpendicularly adjoined to (preferably detachably coupled to) a middle section of the inner side surface of the channel of shuttle track 71a, and is longitudinally aligned and uniformly spaced thereon between the front end and the rear end of shuttle track 71a. The right ends of spacer tubes 72a are perpendicularly adjoined to (preferably detachably coupled to) a middle section of the inner side surface of the channel of shuttle track 71b, and are longitudinally aligned and uniformly spaced thereon between the front end and the rear end of shuttle track 71b.

Shuttle 70 further includes a plurality of spacer tubes 72b and a gear rack 73. Gear rack 73 is disposed between the channel of shuttle track 71a and the channel of shuttle track 71b. Gear rack 73 includes a plurality of gear teeth extended downward therefrom as best shown in FIG. 2E. The left ends of spacer tubes 72b are perpendicularly adjoined to a lower end of the inner side surface of the channel of shuttle track 71a, and are longitudinally aligned and uniformly spaced thereon between the front end and the rear end of shuttle track 71a. The right ends of spacer tubes 72b are perpendicularly adjoined to (preferably detachably coupled to) a lower end of the inner side surface of the channel of shuttle track 71b, and are longitudinally aligned and uniformly spaced thereon between the front end and the rear end of shuttle track 71b. The middle sections of spacer tubes 72b are extended through gear rack 73, and are longitudinally aligned and uniformly spaced therein along an entire length of gear rack 73.

Shuttle 70 further includes a front sprocket 74a, a rear sprocket 74b, and a conveyor belt 75 as best shown in FIG. 2E. Sprocket 74a is rotatably adjoined to (preferably detachably coupled to) the front end of the inner side surface of the channel shuttle track 71a, and the front end of the inner side surface of the channel of shuttle track 71b. Sprocket 74b is rotatably adjoined to (preferably detachably coupled to) the rear end of the inner side surface of the channel of shuttle track 71a and the rear end of the inner side surface of the channel of shuttle track 71b. Conveyor belt 75 is disposed along a top side surface and a bottom side surface of shuttle track 71a, and along a top side surface and a bottom side surface of shuttle track 71b. Conveyor belt 75 has a plurality of gear teeth on an inner surface of conveyor belt 75 that are disposed between shuttle track 71a and shuttle track 71b, and engaged to sprocket 74a and sprocket 74b as best shown in FIG. 2E. Shuttle track 71a, shuttle track 71b, and conveyor belt 75 are selectively dimensioned and strategically adjoined to carrier plate 54a and carrier plate 54b to enable a rotary die disposed upon conveyor belt 75 to be positioned above a rotary die shelf when frame 30 and carriage 50 are aligned with the rotary die shelf as further described in connection with FIG. 5B.

Shuttle 70 further includes a mount plate 76a, a mount plate 76b, a ferromagnetic tab plate 76c, a motor 77, a reducer 78, a sprocket 74c, a sprocket 74d, and a chain 79. An upper end of an inner side surface of mount plate 76a is parallelly adjoined to (preferably detachably coupled to) the front end of an outer side surface of shuttle track 71a as best shown in FIG. 2D. A front edge of tab plate 76c is adjoined to (preferably unitarily fabricated with) a bottom end of a rear edge of mount plate 76a. An upper end of an inner side surface of mount plate 76b is parallelly adjoined to (preferably detachably coupled to) the front end of an outer side surface of shuttle track 71b as best shown in FIG. 2C. A housing of motor 77 is adjoined to (preferably detachably coupled to) a housing of reducer 78, and the housing of reducer 78 is also adjoined to (preferably detachably coupled to) a lower end of the inner side surface of mount plate 76a. Motor 77 includes a drive rod (not shown) that is rotatable in a clockwise direction and in a counterclockwise direction. The drive rod of motor 77 is extended through the housing of reducer 78 and adjoined to (preferably detachably coupled to) reducer 78. Sprocket 74c is adjoined to (preferably detachably coupled to) reducer 78 through the lower end of mount plate 76a. Sprocket 74d is adjoined to (preferably detachably coupled to) sprocket 74a through the front end of shuttle track 71a and an upper end of the outer side surface of mount plate 76a. Chain 79 is engaged with sprocket 74c and sprocket 74d as best shown in FIG. 2D. A cover guard (not shown) is adjoined to the outer side surface of mount plate 76a with sprocket 74c, sprocket 74d, and chain 79 disposed therebetween.

For purposes of the present inventions, a conveyor driver is defined as an assemblage of articles that is operable to transmit a pair of diametric rotational forces to a conveyor belt of a rotary die storage and retrieval unit in accordance with the present inventions to thereby rotate the conveyor belt in either a clockwise direction or a counterclockwise direction. For the illustrated embodiments of the present inventions, a conveyor driver of shuttle 70 includes sprocket, 74a, sprocket 74b, sprocket 74c, sprocket 74d, motor 77, reducer 78, and chain 79 as an assemblage of manufactured articles that is operable to transmit a pair of diametric rotational forces to conveyor belt 75 to thereby rotate conveyor belt 75 in either a clockwise direction or a counterclockwise direction. Specifically, the drive rod of motor 77 is operable to transmit one of the rotational forces to sprocket 74a and sprocket 74b via reducer 78, sprocket 74c, sprocket 74d, and chain 79 to thereby rotate sprocket 74a and sprocket 74b in a clockwise direction, and is further operable to transmit the other rotational force to sprocket 74a and sprocket 74b via reducer 78, sprocket 74c, sprocket 74d, and chain 79 to thereby rotate sprocket 74a and sprocket 74b in a counterclockwise direction.

Referring to FIGS. 2A–2E, rotary die storage and retrieval unit 20 further comprises a shuttle driver 80 adjoined to shuttle 70. For purposes of the present inventions, a shuttle driver is defined as an assemblage of articles that is operative to transmit one translational force of a pair of diametric translational forces to a shuttle of a rotary die storage and retrieval unit in accordance with the present inventions to thereby displace the shuttle. For the illustrated embodiments of the present inventions, shuttle driver 80 is an assemblage of manufactured articles that is operable to transmit one of the translational forces to shuttle 70 to thereby displace shuttle 70 along carrier plate 54a and carrier plate 54b in a forward direction, and to transmit the other translational force to shuttle 70 to thereby displace shuttle 70 along carrier plate 54a and carrier plate 54b in a rearward direction. Shuttle driver 80 includes a mount plate 81, a motor 82, a reducer 83, a lower spur gear 84a, and an upper spur gear 84b. Mount plate 81 is disposed between carrier plate 54a and carrier plate 54b, and a lower side surface of mount plate 81 is adjoined to (preferably detachably coupled to) an upper side surface of spacer tube 55c and an upper side surface of spacer tube 55d. A housing of motor 82 is adjoined to (preferably detachably coupled to) a housing of reducer 83, and the housing of reducer 83 is also adjoined to (preferably detachably coupled to) a top side surface of mount plate 81. Motor 82 includes a drive rod (not shown) that is rotatable in a clockwise direction and in a counterclockwise direction. The drive rod of motor 82 is extended into and adjoined to (preferably detachably coupled to) reducer 83, and spur gear 84a is rotatably adjoined to (preferably detachably coupled to) reducer 83. Spur gear 84a is engaged with spur gear 84b, and spur gear 84b is engaged with the teeth of gear rack 73. The drive rod of motor 82 is operable to transmit a rotational force to spur gear 84b via reducer 83 and spur gear 84a to thereby rotate spur gear 84b in either a counterclockwise direction or a clockwise direction whereby a translational force in either a forward direction or a rearward direction, respectively, is transmitted to shuttle 70.

Referring to FIGS. 2C and 2D, rotary die storage and retrieval unit 20 further comprises a left photo eye 90a, a right photo eye 90b, an upper front wheel 91a, a lower front wheel 91b, an upper rear wheel 91c, a lower rear wheel 91d, a bar 92, a stop plate 93, and a spring (not shown). Photo eye 90a and photo eye 90b are both operable to radiate a ray of light, and are further operable to transmit a signal as an indication of an object intersecting their respective rays of light. Photo eye 90a is adjoined to (preferably detachably coupled to) an upper middle section of an outer side surface of carrier plate 54a. Photo eye 90a is oriented on carrier plate 54a to radiate a ray of light in an upward direction. Wheel 91a and wheel 91b are vertically and spatially aligned, and rotatably adjoined to (preferably detachably coupled to) an upper front end of an outer side surface of carrier plate 54b. Wheel 91c and wheel 91d are vertically and spatially aligned, and rotatably adjoined to (preferably detachably coupled to) an upper rear end of the outer side surface of carrier plate 54b. Wheel 91a is horizontally aligned with wheel 91c, and wheel 91b is horizontally aligned with wheel 91d. A front end of a top side surface and a front end of a bottom side surface of bar 92 is disposed between wheel 91a and wheel 91b, and firmly abuts a channel of wheel 91a and a channel of wheel 91b. A rear end of the top side surface and a rear end of the bottom side surface of bar 92 is disposed between wheel 91c and wheel 91d, and firmly abuts a channel of wheel 91c and a channel of wheel 91d. Photo eye 90b is adjoined to (preferably detachably coupled to) a rear end of bar 92. Photo eye 90b is oriented on bar 92 to radiate a ray of light in an upward direction. A front end of bar 92 is perpendicularly adjoined to (preferably detachably coupled to) a rear side surface of stop plate 93, and a left edge of stop plate 93 is adjoined to (preferably detachably engaged with) shuttle track 71b. Consequently, the displacement of shuttle 70 will displace photo eye 90b as further illustrated herein in connection with FIGS. 5A–6D, and described herein in accompanying text.

Still referring to FIGS. 2C and 2D, rotary die storage and retrieval unit 20 further comprises a left magnetic switch 94a, and a right magnetic switch 94b. Magnetic switch 94a is extended through and adjoined to (preferably detachably coupled to) a middle section of the front end of carrier plate 54a, and is horizontally aligned with tab plate 76c. Magnetic switch 94a is operable to transmit a signal as an indication of a ferromagnetic object being adjacent magnetic switch 94a, and thus magnetic switch 94a transmits the signal when shuttle 70 has been displaced along carrier plate 54a and carrier plate 54b to a point where tab plate 76c is adjacent magnetic switch 94a. Magnetic switch 94b is extended through and adjoined to (preferably detachably coupled to) a middle section of the rear end of carrier plate 54b, and is horizontally aligned with a ferromagnetic tab plate (not shown) adjoined to gear rack 73. Magnetic switch 94b is operable to transmit a signal as an indication of a ferromagnetic object being adjacent magnetic switch 94b, and thus magnetic switch 94b transmits the signal when shuttle 70 has been displaced along carrier plate 54a and carrier plate 54b to a point where the ferromagnetic tab plate adjoined to gear rack 73 is adjacent magnetic switch 94b.

Referring to FIGS. 2A–2E, rotary die storage and retrieval unit 20 further comprises a left thruster 96a, a right thruster 96b, a first platform in the form of a left angle iron 97a, and a second platform in the form of a right angle iron 97b. Thruster 96a is adjoined to (preferably detachably coupled to) the front end of the inner side surface of lift plate 53a, and thruster 96b is adjoined to (preferably detachably coupled to) the front end of the inner side surface of lift plate 53b. A bottom side surface of angle iron 97a is adjoined to (preferably detachably coupled to) thruster 96a, and a bottom side surface of angle iron 97b is adjoined to (preferably detachably coupled to) thruster 96b. Thruster 96a and thruster 96b are operable to displace angle iron 97a and angle iron 97b, respectively, in either an upward direction or a downward direction. Angle iron 97a and angle iron 97b are longitudinally and spatially aligned to support a rotary die having longitudinal edges placed upon angle iron 97a and angle iron 97b.

Figure 3B:
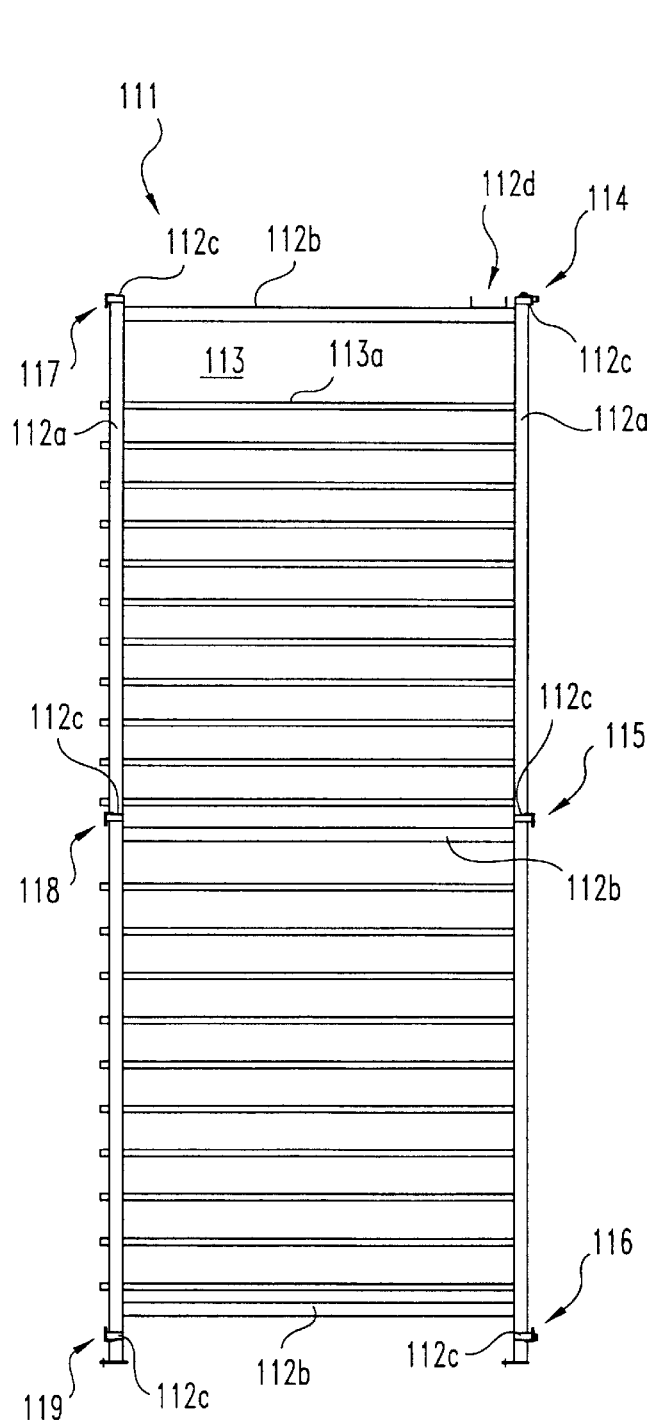
FIG. 3B is a left side view of the rotary die storage rack of FIG. 3A.

FIGS. 3A–3D are views of various components of a rotary die storage rack 111 in accordance with a preferred embodiment of the present inventions, and therefore the illustration and accompanying description herein of rotary die storage rack 111 is given solely for purposes of describing the best mode of the present inventions and is not meant to be limiting as to the scope of a claimed rotary die storage rack in any way. Referring to FIGS. 3A and 3B, rotary die storage rack 111 comprises a frame 112 including twenty (20) self-supporting masts 112a, thirty (30) spacer bars 112b, six (6) beams 112c, and a U-shaped track 112d. The twenty masts 112a are divided into two sets of ten (10) masts 112a. A front set of ten (10) masts 112a are vertically disposed, and equally spaced as best shown in FIG. 3A, and a rear set often (10) masts 112a (not shown except for a rear left end mast 112a in FIG. 3B) are vertically disposed and equally spaced, and aligned behind the front set of masts 112a. The thirty (30) spacer bars 112b are divided into sets of three (3) spacer bars 112b. Each set of three (3) spacer bars 112b are perpendicularly adjoined to (preferably affixed to) and equally spaced along one of the mast 112a of the front set of masts 112a, and a corresponding vertically aligned mast 112a of the rear set of masts 112a. The six (6) beams 112c are divided into two sets of beams 112c. A front set of three (3) beams 112c are adjoined to (preferably detachably coupled to) and equally spaced along a front side surface each mast 112a of the front set often (10) masts 112a as best shown in FIG. 31. A rear set of three (3) beams 112c are adjoined to preferably detachably coupled to) and equally spaced along a rear side surface of each mast 112a of the rear set of ten masts 112a as best shown in FIG. 3B. A base side surface of track 112d is adjoined to (preferably detachably coupled to) a front end of a top side surface of each spacer bar 112b adjoined to the upper ends of masts 112a as best shown in FIG. 3B.

Still referring to FIGS. 3A and 3B, rotary die storage rack 111 further comprises a plurality of rotary die shelves 113. Rotary die shelves 113 form a grid of ten (10) columns and twenty-one rows (21) of rotary die shelves 113. Each rotary die shelf 113 includes a left angle iron 113a and a right angle iron 113b to support the longitudinal edges of a rotary die, e.g. rotary die 10 (FIG. 1). Each left angle iron 113a is adjoined to (preferably affixed to) a right side surface of a mast 112a of the front set of masts 112a (except of the front right end mast 112a), and a corresponding vertically aligned mast 112a of the rear set of masts 112a. Each right angle iron 113b is adjoined to (preferably affixed to) a left side surface of a mast 112a of the front set of masts 112a (except for front left end mast 112a), and a corresponding vertically aligned mast 112a of the rear set of masts 112a. The present inventions contemplates that one or more of rotary die shelves 113 can further include a board or any other supporting object adjoined to left angle iron 113a and right angle iron 113b. Alternatively, the present inventions contemplates that a board or any other supporting object can be substituted for left angle irons 113a and right angle irons 113b, and appropriately adjoined to masts 112a to form the grid of rotary die shelves 113. It is to be appreciated that rotary die storage rack 111 is advantageous over rotary die storage rack 11 (FIG. 1) as related to an efficient use of floor space for a storage and retrieval of a significant amount of rotary dies.

Figure 3C:
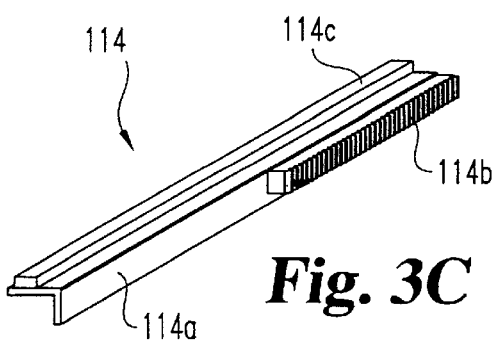
FIG. 3C is a front perspective exploded view of a left end of an upper guide rail of the rotary die storage rack of FIG. 3A.
Figure 3D:
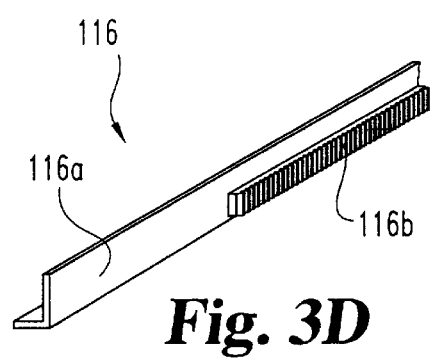
FIG. 3D is a front perspective exploded view of a left end of a lower guide rail of the rotary die storage rack of FIG. 3A.

Referring to FIGS. 3A–3D, rotary die storage rack 111 further comprises a guide rail 114, a middle front angle iron 115, and a guide rail 116 upon which a rotary die storage and retrieval unit in accordance with the present inventions, e.g. rotary die storage and retrieval unit 20 (FIGS. 2A–2E), can be movably mounted upon as illustrated herein in FIGS. 4A and 4B, and described herein in an accompanying text. Guide rail 114 includes an angle iron 114a, a gear rack 114b, and a guide bar 114c. Angle iron 114a is adjoined to (preferably detachably coupled to) a front surface of beam 112c with a longitudinal edge of angle iron 114a that is adjacent a front side surface of angle iron 114a extended downward. Gear rack 114b is adjoined to (preferably detachably coupled to) the front side surface of angle iron 114a as best shown in FIG. 3C with a left end of gear rack 114b being spaced from a left end of angle iron 114a as best shown in FIG. 3C and a right end of gear rack 114b and a portion thereof extending from a right end of the front surface of angle iron 114a as best shown in FIG. 3A. Guide bar 114c is adjoined to (preferably detachably coupled to) a top side surface of angle iron 114a as best shown in FIG. 3C. Angle iron 115 is adjoined to (preferably detachably coupled to) a middle front beam 112c with a longitudinal edge of angle iron 115 that is adjacent a front side surface of angle iron 115 extended downward. Guide rail 116 includes an angle iron 116a, and a gear rack 116b. Angle iron 116a is adjoined to (preferably detachably coupled to) a lower front beam 112c with a longitudinal edge of angle iron 116a that is adjacent a front side surface of angle iron 116a extended upward. Gear rack 116b is adjoined to (preferably detachably coupled to) the front side surface of angle iron 116a as best shown in FIG. 3D with a left end of gear rack 116b being spaced from a left end of angle iron 116a as best shown in FIG. 3D, and a right end of gear rack 116b and a portion thereof extending from a right end of angle iron 116a as best shown in FIG. 3A.

Rotary die storage rack 111 further comprises angle iron 117, angle iron 118, and angle iron 119 to counterbalance a rotary die storage and retrieval unit in accordance with the present inventions, e.g. rotary die storage and retrieval unit 20 (FIGS. 2A–2E), that is movably mounted to guide rail 114, angle iron 115, and guide rail 116. Angle iron 117 is adjoined to (preferably detachably coupled to) an upper rear beam 112c with a longitudinal edge of angle iron 117 that is adjacent a rear side surface of angle iron 117 extended downward. Angle iron 118 is adjoined to (preferably detachably coupled to) a middle rear beam 112c with a longitudinal edge of angle iron 118 that is adjacent a rear side surface of angle iron 118 extended downward. Angle iron 119 is adjoined to (preferably detachably coupled to) a lower rear beam 112c with a longitudinal edge of angle iron 119 that is adjacent a rear side surface of angle iron 119 extended downward.

Referring to FIGS. 4A and 4B, an automated rotary die storage and retrieval system 100 in accordance with one embodiment of the present inventions is shown. System 100 comprises rotary die storage and retrieval unit 20 as previously illustrated and described herein in connection with FIGS. 2A–2E, and rotary die storage rack 111 as previously illustrated and described herein in connection with FIGS. 3A–3D with rotary die storage and retrieval unit 20 movably mounted thereon adjacent a front side opening of rotary die storage rack 111. Wheel 38a (FIGS. 2A–2C) and wheel 38b (FIGS. 2A, 2B and 2D) are rotatably abutting the top side surface of angle iron 114a (FIGS. 3A–3C) aft of guide bar 114c whereby wheel 38a and wheel 38b can be rotatably displaced along the top side surface of angle iron 114a. Angle iron 114a is disposed between cam follower 35 (FIGS. 2A–2D), and drive plate 32a (FIGS. 2A–2D), and drive plate 32b (FIGS. 2A, 2B and 2C) with the cam wheels of cam follower 35 rotatably abutting angle iron 114a whereby the cam wheels of cam follower 34 can be rotatably displaced along angle iron 114a. Angle iron 115 (FIGS. 3A and 3B) is disposed between the cam wheels of cam follower 36a (FIGS. 2A–2C) and the cam wheels of cam follower 36b (FIGS. 2A, 2B and 2D) with the cam wheels of cam follower 36a and cam follower 36b rotatably abutting angle iron 115 whereby the cam wheels of cam follower 36a and cam follower 36b can be rotatably displaced along angle iron 115. Angle iron 116a (FIGS. 3A, 3B and 3C) is disposed between the cam wheels of cam follower 36c (FIGS. 2A–2C) and the cam wheels of cam follower 36d (FIGS. 2A, 2B and 2D) with the cam wheels of cam follower 36c and cam follower 36d rotatably abutting angle iron 116a whereby the cam wheels of cam follower 36c and cam follower 36d can be rotatably displaced along angle iron 116a Spur gear 46a (FIGS. 2A, 2B and 2D) engages the teeth of gear rack 114b (FIGS. 3A–3C) whereby spur gear 46a can be rotatably displaced along gear rack 114b. Spur gear 46b (FIGS. 2A, 2B and 2D) engages the teeth of gear rack 116b (FIGS. 3A, 3B and 3D) whereby spur gear 46b can be rotatably displaced along gear rack 116b.

System 100 further comprises a computer 120, a first set of cables 121, an upper control box 122, a second set of cables 123, a third set of cables (not shown), a fourth set of cables 124, a lower control box 125, and several pairs of cables (not shown). One end of cables 121 is coupled to computer 120, and the other end of cables 121 is disposed within control box 122. One end of cables 123 are coupled to motor 41 (FIGS. 2A, 2B, and 2D) and the encoder of reducer 42 (FIGS. 2A, 2B, and 2D), and the other end of cables 123 are disposed within control box 122 and coupled to a first subset of cables 121. The middle portions of the first subset of cables 123 are longitudinally disposed within a channel of track 112d (FIG. 3B). Computer 120 is operable to transmit a first control signal via the appropriate connecting cable to motor 41 (FIGS. 2A, 2B and 2D). In response to the first control signal, motor 41 operatively rotates spur gear 46a (FIGS. 2A, 2B, and 2D) and spur gear 46b (FIGS. 2A, 2B, and 2D) in either a clockwise direction or a counterclockwise direction to thereby transmit a translational force to frame 30 (FIGS. 2A–2D) whereby frame 30 is displaced alongside the front side opening of rotary die storage rack 111 in either in a left direction or a right direction, respectively. Computer 120 is further operable to transmit a second control signal via the appropriate connecting cable to the encoder of reducer 42. In response to the second control signal, the encoder of reducer 42 operatively transmits a first detection signal via the appropriate connecting cable to computer 120 as an indication of a degree and direction of any rotational movement of spur gear 46a and spur gear 46b. Consequently, frame 30 can be displaced alongside the front side opening of rotary die storage rack 111 in a direction of a desired rotary die shelf 113 until frame 30 is aligned with a vertical column of rotary die shelves 113 containing the desired rotary die shelf 113.

Still referring to FIGS. 4A and 4B, one end of the third set of cables are disposed within control box 122 and coupled to a second subset of cables 121, and the other end of the third set of cables is coupled to motor 61 (FIGS. 2A–2C) and to the encoder of reducer 62 (FIGS. 2A and 2B). Computer 120 is further operable to transmit a third control signal via the appropriate connecting cable to motor 61. In response to the third control signal, motor 61 operatively rotates chain 65a (FIGS. 2A–2C) and chain 65b (FIGS. 2A, 2B, and 2D) in either a clockwise direction or a counterclockwise direction to thereby transmit a translational force to carriage 50 (FIGS. 2A–2D) whereby carriage 50 is displaced along frame 30 (FIGS. 2A–2D) in either an upward direction or a downward direction, respectively. Computer 120 is further operable to transmit a fourth control signal via the connecting cable to the encoder of reducer 62. In response to the fourth control signal, the encoder of reducer 62 operatively transmits a second detection signal via the appropriate connecting cable to computer 120 as an indication of a degree and direction of any rotational movement of chain 65a and chain 65b. Consequently, carriage 50 can be displaced along frame 30 in a direction of a desired rotary die shelf 113 until carriage 50 is aligned with a horizontal row of rotary dies shelves 113 containing the desired rotary die shelf 113.

Still referring to FIGS. 4A and 4B, one end of cables 124 are disposed within control box 122 and coupled to a third subset of cables 122, and the other end of cables 124 is disposed within control box 125. One end of a first pair of cables (not shown) are coupled to motor 81 (FIGS. 2A, 2B and 2E), and the other end of the first pair of cables are disposed within control box 125 and coupled to a first subset of cables 124. Computer 120 is further operable to transmit a fifth control signal and a sixth control signal via the appropriate connecting cable to motor 81. In response to the fifth control signal, motor 81 operatively rotates spur gear 84b (FIG. 2E) in a counterclockwise direction to thereby transmit a translational force to shuttle 70 (FIGS. 2A–2E) whereby shuttle 70 is displaced in a forward direction along carrier plate 54a (FIGS. 2A, 2B, and 2D) and carrier plate 54b (FIGS. 2A–2C, and 2E). In response to the sixth control signal, motor 81 operatively rotates spur gear 84b (FIG. 2E) in a clockwise direction to thereby transmit a translational force to shuttle 70 (FIGS. 2A–2E) whereby shuttle 70 is displaced in a rearward direction along carrier plate 54a and carrier plate 54b. Consequently, when frame 30 and carriage 50 are aligned with a desired rotary die shelf 113, shuttle 70 is adjacent the desired rotary die shelf 113, and shuttle 70 or a portion thereof is extendable into and retractable out of the front side opening of rotary die storage rack 111.

Still referring to FIGS. 4A and 4B, one end of a second pair of cables (not shown) are coupled to photo eye 90a (FIG. 2C), and the other end of the second pair of cables is disposed within control box 125 and coupled to a second subset of cables 124. Computer 120 is further operable to transmit a seventh control signal via the appropriate connecting cable to photo eye 90a. In response to the seventh control signal, photo eye 90a operatively transmits a ray of light in an upward direction and operatively transmits a third detection signal via the appropriate connecting cable to computer 120 as an indication of a portion of a rotary die (as supported by shuttle 70) intersecting the ray of light. One end of a third pair of cables (not shown) are coupled to photo eye 90b (FIG. 2D), and the other end of the third pair of cables is disposed within control box 125 and coupled to a third subset of cables 124. Computer 120 is further operable to transmit an eighth control signal via the appropriate connecting cable to photo eye 90b. In response to the eighth control signal, photo eye 90b operatively transmits a ray of light in an upward direction and operatively transmits a fourth detection signal via the appropriate connecting cable to computer 120 as an indication of a portion of a rotary die (as supported by shuttle 70) intersecting the ray of light.

Still referring to FIGS. 4A and 4B, one end of a fourth pair of cables (not shown) are coupled to magnetic switch 94a (FIG. 2D), and the other end of the fourth pair of cables is disposed within control box 125 and coupled to a fourth subset of cables 124. Computer 120 is further operable to transmit a ninth control signal via the appropriate connecting cable to magnetic switch 94a. In response to the ninth control signal, magnetic switch 94a operatively transmits a fifth detection signal via the appropriate connecting cable to computer 120 when ferromagnetic tab plate 76c (FIG. 2D) is adjacent magnetic switch 94a. One end of a fifth pair of cables (not shown) are coupled to magnetic switch 94b (FIG. 2C), and the other end of the fifth pair of cables is disposed within control box 125 and coupled to a fifth subset of cables 124. Computer 120 is further operable to transmit a tenth control signal via the appropriate connecting cable to magnetic switch 94b. In response to the tenth control signal, magnetic switch 94b operatively transmits a sixth detection signal via the appropriate connecting cable to computer 120 when a ferromagnetic tab plate adjoined to gear rack 73 (FIG. 2E) is adjacent magnetic switch 94b.

Still referring to FIGS. 4A and 4B, one end of a sixth pair of cables (not shown) are coupled to thruster 96a (FIGS. 2A–2C), and the other end of the sixth pair of cables is disposed within control box 125 and coupled to a sixth subset of cables 124. Computer 120 is further operable to transmit an eleventh control signal via the appropriate connecting cable to thruster 96a. In response to the eleventh control signal, thruster 96a operatively transmits a translational force to angle iron 97a (FIGS. 2A–2C) in an upward direction. Upon a cessation of the eleventh control signal, thruster 96a operatively transmits a translational force to angle iron 97a in a downward direction. One end of a seventh pair of cables (not shown) are coupled to thruster 96b (FIGS. 2A, 2B, 2C, and 2D), and the other end of the seventh pair of cables is disposed within control box 125 and coupled to a seventh subset of cables 124. Computer 120 is further operable to transmit the eleventh control signal via the appropriate connecting cable to thruster 96b. In response to the eleventh control signal, thruster 96b operatively transmits a translational force to angle iron 97b (FIGS. 2A, 2B, 2C, and 2D) in an upward direction. Upon a cessation of the eleventh control signal, thruster 96b operatively transmits a translational force to angle iron 97b in a downward direction.

An exemplary illustration in accordance with the present inventions of an utilization of shuttle 70 (FIGS. 2A–2E) to store rotary die 10 (FIG. 1) upon a desired rotary die shelf 113 (FIG. 3A) of rotary die storage rack 111 (FIGS. 3A and 3B) and to subsequently retrieve stored rotary die 10 from upon rotary die shelf 113 will now be described herein in connection with FIGS. 5A–5F. It is to be appreciated and understood that alternative embodiments of a shuttle, a rotary die shelf, and a rotary die storage rack in accordance with the present inventions can be substituted for shuttle 70, rotary die shelf 113, and rotary die storage rack 111, respectively, in the performance of the following exemplified storage and retrieval of rotary die 10. For purposes of the exemplified illustration, rotary die 10 includes an elongated semi-circular body 10a having a left longitudinal edge (not shown) and a right longitudinal edge (not shown), and a length of body 10a is approximately one-third of a length of shuttle 70. It is to appreciated and understood that other rotary dies including a differently configured and/or dimensioned body can also be stored and retrieved in accordance with the present inventions.

Referring to FIG. 5A, a convex surface of body 10a of rotary die 10 is disposed upon conveyor belt 75 adjacent a proximal end of shuttle 70, and supported thereupon. Alternatively, the convex surface of body 10a of rotary die 10 can be disposed upon conveyor belt 75 adjacent a middle section or a distal end of shuttle 70. Antecedently or subsequently to supporting the convex surface of body 10a of rotary die 10 upon conveyor belt 75, shuttle 70 can be disposed adjacent rotary die shelf 113, i.e. frame 30 (FIGS. 2A–2D) is aligned with the corresponding vertical column containing rotary die shelf 113 and carriage 50 (FIGS. 2A–2E) is aligned with the corresponding horizontal row containing rotary die shelf 113. It is to be appreciated and understood that alternative embodiments of a frame and a carriage in accordance with the present inventions can be substituted for frame 30 and carriage 50 in disposing a shuttle in accordance with the present inventions adjacent a rotary die shelf in accordance with the present inventions. Prior to disposing shuttle 70 adjacent rotary die shelf 113 and in addition to positioning the leading edge of body 10a flush with the leading edge of shuttle 70 as illustrated and described in connection with FIG. 5B. magnetic switch 94b (FIG. 2C) must be transmitting a detection signal to computer 120 (FIGS. 4A and 4B) indicating that the ferromagnetic tab plate adjoined to gear rack 73 (FIG. 2E) is adjacent magnetic switch 94b, i.e. the distal end of shuttle 70 is disposed outside of the side opening of rotary die storage rack 111. This prevents shuttle 70 from colliding with a front mast 112 (FIGS. 3A and 3B) of rotary die storage rack 11 as shuttle 70 is being disposed adjacent rotary die shelf 113. Antecedently, concurrently, or subsequently to supporting the convex surface of body 10a of rotary die 10 upon conveyor belt 75, computer 120 can signal thruster 96a (FIGS. 2A–2C) and thruster 96b (FIGS. 2A, 2B, 2D and 2E) to transmit an upward translational force to angle iron 97a and angle iron 97b whereby the left longitudinal edge of body 10a would be supported by angle iron 97a and the right longitudinal edge of body 10a would be supported by angle iron 97b.

Referring to FIG. 5B, if the convex surface of body 10a of rotary die 10 was disposed upon conveyor belt 75a and a leading edge of body 10a is not flush with a leading edge of shuttle 70, computer 120 signals the conveyor driver of shuttle 70 to operatively transmit a rotational force to conveyor belt 75 to thereby rotate conveyor belt 75 whereby body 10a is displaced along shuttle 70 toward the distal end of shuttle 70. Computer 120 ceases signaling the conveyor driver of shuttle 70 to operatively transmit the rotational force to conveyor belt 75 upon a receipt from photo eye 90b of a detection signal indicating the leading edge of body 10a is intersecting a ray of light upwardly emanating from photo eye 90b. It is to be appreciated that a leading edge of photo eye 90b being flush with the distal end of shuttle 70 positions the leading edge of body 10a flush with the distal end of shuttle 70. Subsequently to positioning the leading edge of body 10a flush with the distal end of shuttle 70, shuttle 70 can be disposed adjacent rotary die shelf 113 if shuttle 70 has not been previously disposed adjacent rotary die shelf 113, and computer 120 can signal thruster 96*a* and thruster 96*b* to transmit an upward translational force to angle iron 97*a* and angle iron 97*b* whereby the left longitudinal edge of body 10*a* would be supported by angle iron 97*a* and the right longitudinal edge of body 10*a* would be supported by angle iron 97*b* if the left longitudinal edge and the right longitudinal edge of body 10*a* are not being previously supported by angle iron 97*a* and angle iron 97*b*, respectively.

Referring to FIG. 5C, upon the flush positioning of the leading edge of body 10*a* with the distal end of shuttle 70 and upon the adjacent disposal of shuttle 70 with rotary die shelf 113, the longitudinal edges of body 10*a* are above a supporting surface of angle iron 113*a* and a supporting surface of angle 113*b*. Computer 120 signals shuttle driver 80 (FIG. 2E) to operatively transmit a translational force in a direction of rotary die shelf 113 to shuttle 70 to thereby displace shuttle 70 along carrier plate 54*a* (FIGS. 2A, 2B and 2C) and carrier plate 54*b* (FIGS. 2A–2C, and 2E) in a direction of rotary die shelf 113 whereby shuttle 70 and rotary die 10 are being extended into the side opening of rotary die storage rack 111. Photo eye 90*b* is concurrently displaced with shuttle 70 until the leading edge of photo eye 90*b* is displaced contiguous with, but not extended into, the side opening of rotary die storage rack 113. Photo eye 90*b* continually transmits the detection signal to computer 120 as long as any portion of body 10*a* is intersecting the ray of light upwardly emanating from photo eye 90*b*. Computer 120 ceases signaling shuttle driver 80 to operatively transmit the translational force to shuttle 70 upon a ceasing of a receipt by computer 120 of the detection signal from photo eye 90*b* that a portion of body 10*a* is intersecting the ray of light upwardly emanating from photo eye 90*b*. It is to be appreciated that a trailing edge of body 10*a* is now flush with a proximal end of angle iron 113*a* and a proximal end of angel iron 113*b*.

Referring to FIG. 5D, upon a cessation of shuttle driver 80 transmitting the translational force in a direction of the rotary die shelf 113 to shuttle 70, computer 120 signals carriage driver 60 (FIGS. 2A–2D) to operatively transmit a translational force in a downward direction to carriage 50 to thereby displace carriage 50 in a downward direction along frame 30 whereby the convex surface of body 10*a* is completely displaced from upon conveyor belt 75 and whereby the longitudinal edges of body 10*a* are displaced from upon the supporting surfaces of angle iron 97*a* and angle 97*b* and disposed upon the supporting surfaces of angle iron 113*a* and angle iron 113*b*. If the longitudinal edges were not being supported by the supporting surfaces of angle iron 97*a* and angle iron 97*b*, then the longitudinal edges were simply disposed upon the supporting surfaces of angle iron 113*a* and angle iron 113*b*. Computer 120 ceases signaling carriage driver 60 to operatively transmit the downward translational force to carriage 50 upon receipt of a detection signal from the encoder of reducer 62 (FIGS. 2A and 2B) that carriage 50 has been displaced a predetermined distance. Computer 120 then signals shuttle driver 80 to operatively transmit a translational force to shuttle 70 in a rearward direction opposing rotary die shelf 113 to thereby displace shuttle 70 along carrier plate 54*a* and carrier plate 54*b* in the rearward direction whereby shuttle 70 is being retracted from within the side opening of rotary die storage rack 113. Computer 120 ceases signaling shuttle driver 80 to operatively transmit the translational force upon receipt from magnetic switch 94*b* of a detection signal indicating the distal end of shuttle 70 is adjacent magnetic switch 94*b* and retracted out of the side opening of rotary die storage rack 111. At this point, rotary die 10 has been stored upon rotary die shelf 113.

Referring to FIG. 5E, to begin a retrieval of rotary die 10, shuttle 70 is again disposed adjacent rotary die shelf 113 if shuttle 70 has been intermittently displaced elsewhere. Computer 120 then signals shuttle driver 80 to operatively transmit a translational force to shuttle 70 in a forward direction toward rotary die shelf 113 to thereby displace shuttle 70 along carrier plate 54*a* and carrier plate 54*b* in the forward direction of rotary die shelf 113 whereby shuttle 70 is being extended into the side opening of rotary die storage rack 111. Computer 120 ceases signaling shuttle driver 80 to operatively transmit the translational signal upon a receipt from magnetic switch 94*a* of a detection signal indicating that a tab plate 74*c* (FIG. 2D) is adjacent magnetic switch 94*a*, i.e. a proximal end of shuttle 70 is adjacent a distal end of carriage 50. Computer 120 then signals carriage driver 60 to operatively transmit a translational force in an upward direction to carriage 50 to thereby displace carriage 50 in a upward direction along frame 30 whereby the convex surface of body 10*a* is disposed upon conveyor belt 75 and whereby the longitudinal edges of body 10*a* are displaced from the supporting surfaces of angle iron 113*a* and angle iron 113*b* and supported by angle iron 97*a* and angle iron 97*b* if they are upwardly displaced by thruster 96*a* and thruster 96*b*, respectively. Computer 120 ceases signaling carriage driver 60 to operatively transmit the translational force to carriage 50 upon receipt of a detection signal from the encoder of reducer 62 that carriage 50 has been upwardly displaced a predetermined distance.

Referring to FIG. 5F, upon executing a displacement of body 10*a* from the supporting surfaces of angle iron 113*a* and angle iron 113*b* onto conveyor belt 75 and/or angle iron 97*a* and angle iron 97*b*, computer 120 signals shuttle driver 80 to operatively transmit a translational force to shuttle 70 in a rearward direction from rotary die shelf 113 to thereby displace shuttle 70 along carrier plate 54*a* and carrier plate 54*b* in the rearward direction whereby shuttle 70 and rotary die 10 are being retracted from within the side opening of the rotary die storage rack. Computer 120 ceases signaling shuttle driver 80 to operatively transmit the translation force to shuttle 70 upon receipt from magnetic switch 94*b* of a detection signal indicating the distal end of shuttle 70 is adjacent magnetic switch 94*b* and fully retracted out of the side opening of rotary die storage rack 111. At this point, rotary die 10 has been retrieved from rotary die shelf 113. Antecedently, concurrently, or subsequently to displacing shuttle 70, computer 120 can signal the conveyor drive of shuttle 70 to operatively transmit a rotational force to conveyor belt 75 to thereby rotate conveyor belt 75 whereby body 10*a* is displaced toward the proximal end of shuttle 70. If and as body 10*a* is being displaced toward the proximal end of shuttle 70, photo eye 90*a* transmits a detection signal to computer 120 when the trailing edge of body 10*a* intersects a ray of light upwardly emanating from photo eye 90*a*. Photo eye 90*a* continually transmits the detection signal as long as any portion of body 10*a* is intersecting the ray of light upwardly emanating from photo eye 90*a*. Computer 120 ceases signaling the conveyor driver of shuttle 70 to operatively transmit the rotational force to conveyor belt 75 upon a ceasing of a receipt by computer 120 of the detection signal from photo eye 90*a* that a portion of body 10*a* is intersecting the ray of light upwardly emanating from photo eye 90*a*. A U-shaped bar 98 can optionally be adjoined to (preferably detachably coupled to) lift plate 53*a* (FIGS. 2A–2C) and lift plate 54*b* (FIGS. 2A, 2B, 2D, and 2E) as shown to prevent rotary die 10 from being displaced off of conveyor belt 75 in the event computer 120 does not timely cease signaling the conveyor driver of shuttle 70 to operatively transmit the rotational force to conveyor belt 75.

An exemplary illustration in accordance with the present inventions of an utilization of shuttle 70 (FIGS. 2A–E) to store a rotary die 10' upon a desired rotary die shelf 113 (FIG. 3A) of rotary die storage rack 111 (FIGS. 3A and 3B) and to subsequently retrieve stored rotary die 10' from upon rotary die shelf 113 will now be described herein in connection with FIGS. 6A–6D. It is to be appreciated and understood that alternative embodiments of a shuttle, a rotary die shelf, and a rotary die storage rack in accordance with the present inventions can be substituted for shuttle 70, rotary die shelf 113, and rotary die storage rack 111, respectively, in the performance of the following exemplified storage and retrieval of rotary die 10'. For purposes of the exemplified illustration, rotary die 10' includes an elongated semi-circular body 10a' having a left longitudinal edge (not shown) and a right longitudinal edge (not shown), and a length of body 10a' approximates a length of shuttle 70.

Referring to FIG. 6A, a convex surface of body 10a' of rotary die 10' is disposed upon conveyor belt 75, and supported thereupon. If computer 120 receives from photo eye 90b a detection signal indicating a portion of body 10a' intersecting a ray of light upwardly emanating from photo eye 90b, computer 120 signals the conveyor driver of shuttle 70 to operatively transmit a rotational force to conveyor belt 75 to thereby rotate conveyor belt 75 whereby body 10a' is displaced toward the proximal end shuttle 70. Computer 120 ceases signaling the conveyor driver of shuttle 70 to operatively transmit the rotational force to conveyor belt 75 upon a ceasing of a receipt by computer 120 of the detection signal from photo eye 90b. Subsequently, computer 120 signals the conveyor driver of shuttle 70 to operatively transmit a second rotational force to conveyor belt 75 to thereby rotate conveyor belt 75 whereby body 10a' is displaced toward the distal end of shuttle 70. Computer 120 ceases signaling the conveyor driver of shuttle 70 to operatively transmit the second rotational force to conveyor belt 75 upon a second receipt of the detection signal from photo eye 90b. It is to be appreciated that leading edge of photo eye 90b being flush with the leading edge of shuttle 70 positions the leading edge of body 10a flush with the leading edge of shuttle 70. Antecedently or subsequently to supporting the convex surface of body 10a' of rotary die 10' upon conveyor belt 75, shuttle 70 can be disposed adjacent rotary die shelf 113, i.e. frame 30 (FIGS. 2A–2D) is aligned with the corresponding vertical column containing rotary die shelf 113 and carriage 50 (FIGS. 2A–2E) is aligned with the corresponding horizontal row containing rotary die shelf 113. Prior to disposing shuttle 70 adjacent rotary die shelf 113 and in addition to positioning the leading edge of body 10a' flush with the leading edge of shuttle 70, magnetic switch 94b (FIG. 2C) must be transmitting a detection signal to computer 120 (FIGS. 4A and 4B) indicating that the tab plate adjoined to gear rack 73 (FIG. 2E) is adjacent magnetic switch 94b, i.e. the distal end of shuttle 70 is disposed outside of the side opening of rotary die storage rack 111. This prevents shuttle 70 and rotary die 10' from colliding with a front mast 112 (FIGS. 3A and 3B) of rotary die storage rack 111 as shuttle 70 is being disposed adjacent rotary die shelf 113. Antecedently, concurrently, or subsequently to supporting the convex surface of body 10a of rotary die 10 upon conveyor belt 75, computer 120 can signal thruster 96a (FIGS. 2A–2C) and thruster 96b (FIGS. 2A, 2B, 2D and 2E) to transmit an upward translational force to angle iron 97a and angle iron 97b whereby the left longitudinal edge of body 10a' would be supported by angle iron 97a and the right longitudinal edge of body 10a' would be supported by angle iron 97b.

Referring to FIG. 6B, upon the flush positioning of the leading edge of body 10a' with the leading edge of shuttle 70 and upon the adjacent disposal of shuttle 70 with rotary die shelf 113, the longitudinal edges of body 10a' are above a supporting surface of angle iron 113a and a supporting surface of angle 113b. Computer 120 signals shuttle driver 80 (FIG. 2E) to operatively transmit a translational force in a direction of rotary die shelf 113 to shuttle 70 to thereby displace shuttle 70 along carrier plate 54a (FIGS. 2A, 2B and 2C) and carrier plate 54b (FIGS. 2A–2C, and 2E) in a direction of rotary die shelf 113 whereby shuttle 70 and rotary die 10' are being extended into the side opening of rotary die storage rack 111. Photo eye 90b is concurrently displaced with shuttle 70 until the leading edge of photo eye 90b is displaced contiguous with, but not extended into, the side opening of rotary die storage rack 113. Photo eye 90b continually transmits the detection signal to computer 120 as long as any portion of body 10a is intersecting the ray of light upwardly emanating from photo eye 90b. Computer 120 ceases signaling shuttle driver 80 to operatively transmit the translational signal upon a receipt from magnetic switch 94a of a detection signal indicating that a tab plate 74c (FIG. 2D) is adjacent magnetic switch 94a, i.e. the proximal end of shuttle 70 is adjacent a distal end of carriage 50. Computer 120 then signals the conveyor driver of shuttle 70 to operatively transmit a rotational force to conveyor belt 75 to thereby rotate conveyor belt 75 whereby the leading edge and an adjacent portion thereof of body 10a' is displaced from the distal end of shuttle 70. Computer 120 ceases signaling the conveyor driver of shuttle 70 to operatively transmit the rotational force to conveyor belt 75 upon a ceasing of a receipt by computer 120 of the detection signal from photo eye 90b. It is to be appreciated that a trailing edge of body 10a' is now flush with a proximal end of angle iron 113a and a proximal end of angel iron 113b.

Referring to FIG. 6C, upon a cessation of the conveyor driver of shuttle 70 operatively transmitting the rotational force to conveyor belt 75, computer 120 signals carriage driver 60 (FIGS. 2A–2D) to operatively transmit a translational force in a downward direction to carriage 50 to thereby displace carriage 50 in a downward direction along frame 30 whereby the convex surface of body 10a is completely displaced from upon conveyor belt 75 and whereby the longitudinal edges of body 10a' are displaced from upon the supporting surfaces of angle iron 97a and angle 97b and disposed upon the supporting surfaces of angle iron 13a and angle iron 113b. If the longitudinal edges were not being supported by the supporting surfaces of angle iron 97a and angle iron 97b, then the longitudinal edges were simply disposed upon the supporting surfaces of angle iron 113a and angle iron 113b. Computer 120 ceases signaling carriage driver 60 to operatively transmit the downward translational force to carriage 50 upon receipt of a detection signal from the encoder of reducer 62 (FIGS. 2A and 2B) that carriage 50 has been displaced a predetermined distance. Computer 120 then signals shuttle driver 80 to operatively transmit a translational force to shuttle 70 in a rearward direction opposing rotary die shelf 113 to thereby displace shuttle 70 along carrier plate 54a and carrier plate 54b in the rearward direction whereby shuttle 70 is being retracted from within the side opening of rotary die storage rack 113. Computer 120 ceases signaling shuttle driver 80 to operatively transmit the translational force upon receipt from magnetic switch 94b of a detection signal indicating the distal end of shuttle 70 is adjacent magnetic switch 94b and retracted out of the side opening of rotary die storage rack 111. At this point, rotary die 10' has been stored upon rotary die shelf 113.

Referring again to FIG. 6B, to begin a retrieval of rotary die 10', shuttle 70 is again disposed adjacent rotary die shelf 113 if shuttle 70 has been intermittently displaced elsewhere. Computer 120 then signals shuttle driver 80 to operatively transmit a translational force to shuttle 70 in a forward direction toward rotary die shelf 113 to thereby displace shuttle 70 along carrier plate 54a and carrier plate 54b in the direction of rotary die shelf 113 whereby shuttle 70 is being extended into the side opening of rotary die storage rack 11. Computer 120 ceases signaling shuttle driver 80 to operatively transmit the translational signal upon receipt from magnetic switch 94a that a tab plate 74c is adjacent magnetic switch 94a. Computer 120 then signals carriage driver 60 to operatively transmit a translational force in an upward direction to carriage 50 to thereby displace carriage 50 in a upward direction along frame 30 whereby the convex surface of body 10a' is supported upon conveyor belt 75 and whereby the longitudinal edges of body 10a' are displaced from the supporting surfaces of angle iron 113a and angle iron 113b. Computer 120 ceases signaling carriage driver 60 to operatively transmit the translational force to carriage 50 upon receipt of a detection signal from the encoder of reducer 62 that carriage 50 has been upwardly displaced a predetermined distance.

Referring to FIG. 6D, upon executing a displacement of body 10a' from the supporting surfaces of angle iron 113a and angle iron 113b, computer 120 signals shuttle driver 80 to operatively transmit a translational force to shuttle 70 in a rearward direction from rotary die shelf 113 to thereby displace shuttle 70 along carrier plate 54a and carrier plate 54b in the rearward direction whereby shuttle 70 and rotary die 10 are being retracted from within the side opening of the rotary die storage rack. Computer 120 ceases signaling shuttle driver 80 to operatively transmit the translation force to shuttle 70 upon receipt from magnetic switch 94b of a detection signal indicating the distal end of shuttle 70 is adjacent magnetic switch 94b and fully retracted out of the side opening of rotary die storage rack 111. Antecedently, concurrently, or subsequently to displacing shuttle 70, computer 120 signals the conveyor drive of shuttle 70 to operatively transmit a first rotational force to conveyor belt 75 to thereby rotate conveyor belt 75 whereby body 10a' is displaced toward the proximal end of shuttle 70. If and as body 10a' is being displaced toward the proximal end of shuttle 70, photo eye 90a transmits a detection signal to computer 120 when the trailing edge of body 10a' intersects a ray of light upwardly emanating from photo eye 90a. Photo eye 90a continually transmits the detection signal as long as any portion of body 10a' is intersecting the ray of light upwardly emanating from photo eye 90a. Computer 120 ceases signaling the conveyor driver of shuttle 70 to operatively transmit the rotational force to conveyor belt 75 upon a ceasing of a receipt by computer 120 of the detection signal from photo eye 90b that a portion of body 10a' is intersecting the ray of light upwardly emanating from photo eye 90b. Computer 120 signals the conveyor drive of shuttle 70 to operatively transmit a second rotational force to conveyor belt 75 to thereby rotate conveyor belt 75 whereby body 10a' is displaced toward the distal end of shuttle 70. Computer 120 ceases signaling the conveyor driver of shuttle 70 to operatively transmit the rotational force to conveyor belt 75 upon a receipt by computer 120 of a detection signal from photo eye 90b that a portion of body 10a' is intersecting the ray of light upwardly emanating from photo eye 90b, i.e. the leading edge of body 10a' is flush with the leading edge of shuttle 70. A U-shaped bar 98 can optionally be adjoined to (preferably detachably coupled to) lift plate 53a (FIGS. 2A–2C) and lift plate 54b (FIGS. 2A, 2B, 2D, and 2E) as shown to prevent rotary die 10' from being displaced off of conveyor belt 75 in the event computer 120 does not timely cease signaling the conveyor driver of shuttle 70 to operatively transmit the rotational force to conveyor belt 75. At this point, rotary die 10' has been retrieved from rotary die shelf 113. Computer 120 can then signal the conveyor drive of shuttle 70 to operatively transmit a rotational force to conveyor belt 75 to thereby rotate conveyor belt 75 whereby body 10a' is displaced toward the distal end of shuttle 70.

Figure 7A:
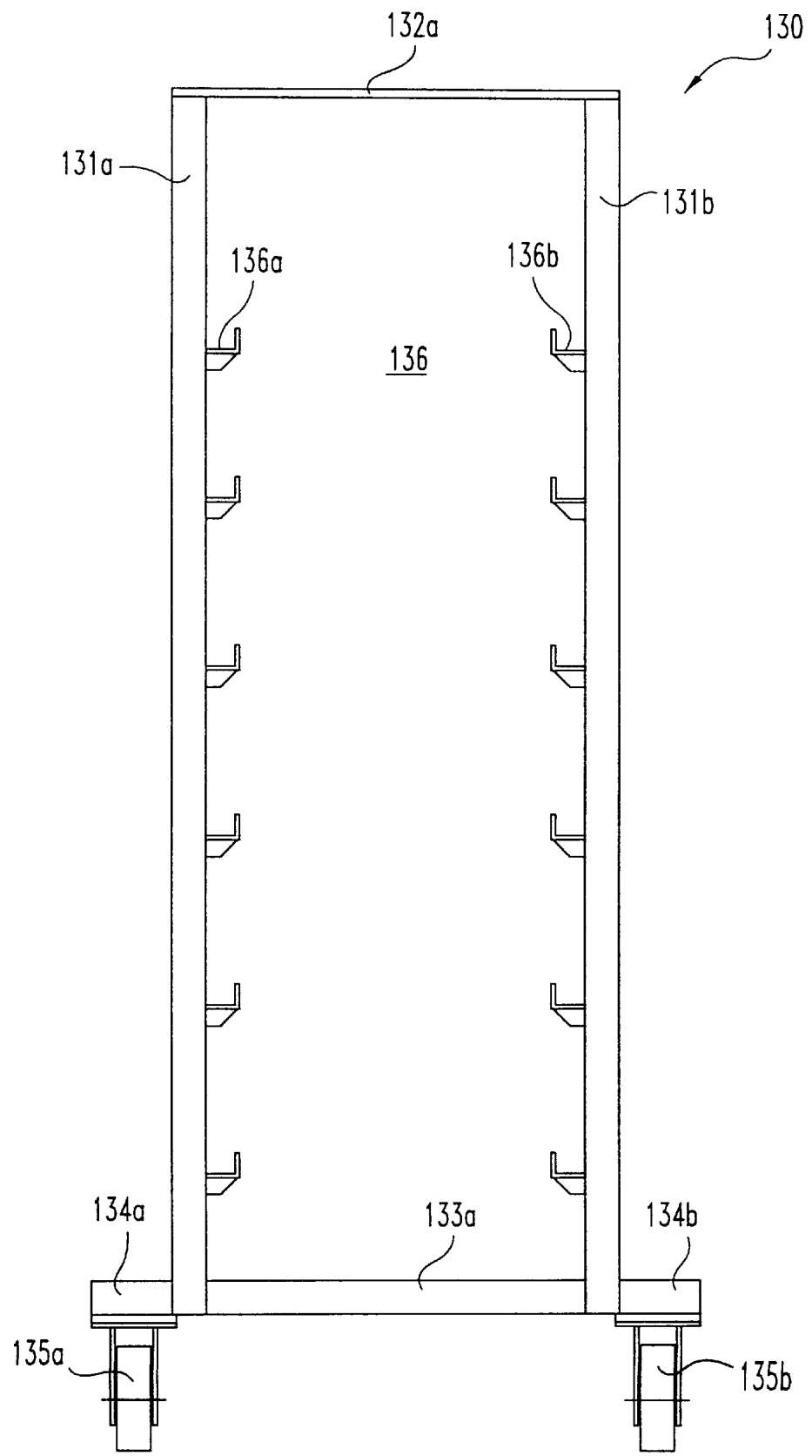
FIG. 7A is a front view of one embodiment of a rotary die storage cart in accordance with the present inventions.
Figure 7B:
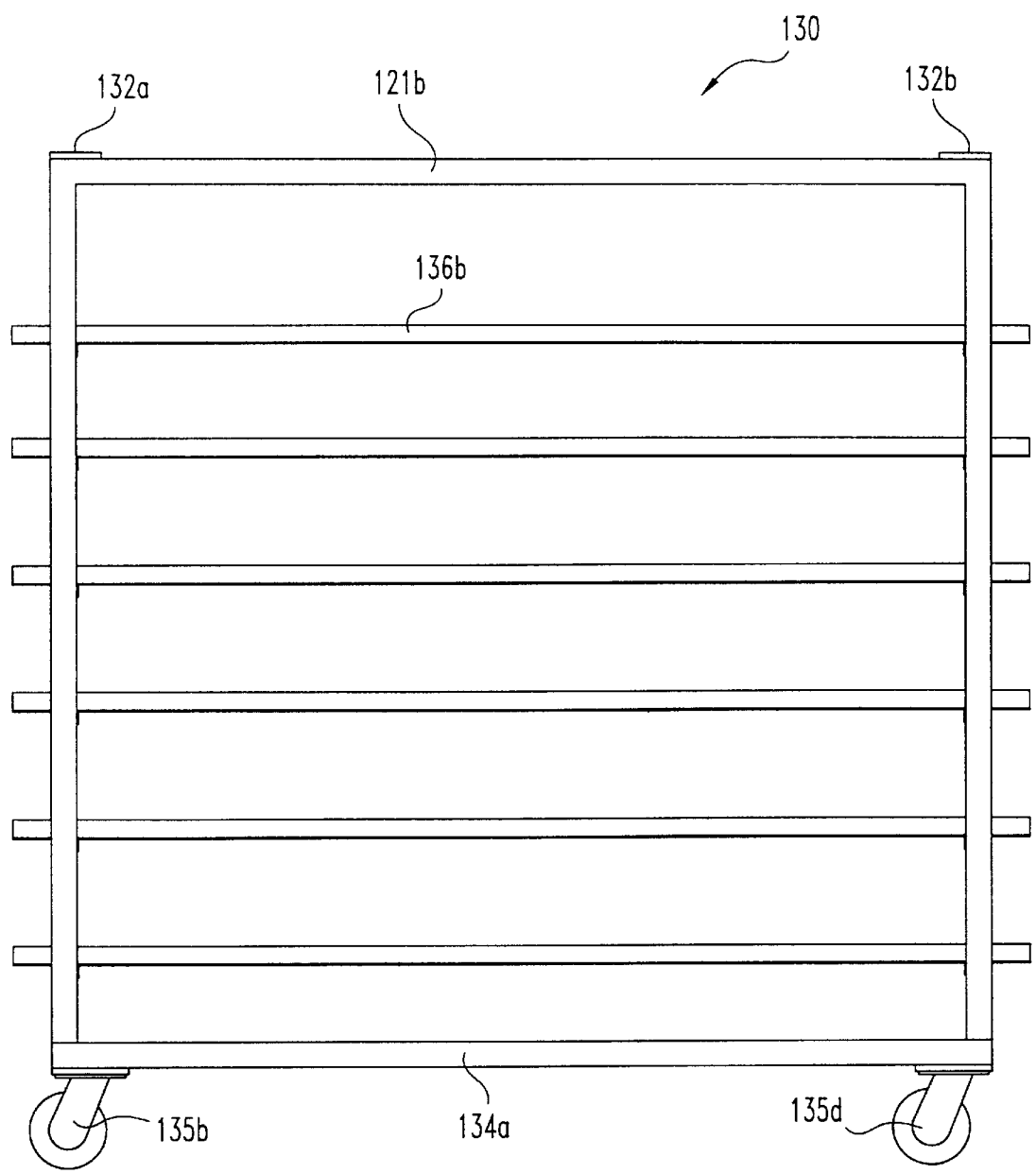
FIG. 7B is a left side view of the rotary die storage cart in FIG. 7A.

FIGS. 7A and 7B are views of a rotary die storage cart 130 in accordance with a preferred embodiment of the present inventions, and therefore the illustration and accompanying description herein of rotary die storage cart 130 is given solely for purposes of describing the best mode of the present inventions and is not meant to be limiting as to the scope of a claimed rotary die storage cart in any way. Referring to FIGS. 7A and 7B, rotary die storage cart 130 comprises a left rectangular frame 131a, a right rectangular frame 131b, a front upper plate 132a, a rear upper plate 133a, a front lower spacer bar 133a, and a rear lower spacer bar (not shown). Frame 131a and frame 131b are vertically disposed. Preferably, frame 131a and frame 131b are symmetrically configured, dimensioned, and aligned. A left end of a bottom surface of plate 132a is parallelly adjoined to (preferably affixed to) a front end of an upper longitudinal edge of frame 131a, and a right end of the bottom surface of plate 132a is parallelly adjoined to (preferably affixed to) a front end of an upper longitudinal edge of frame 131b. A left end of a bottom surface of plate 132b is parallelly adjoined to (preferably affixed to) a rear end of the upper longitudinal edge of frame 131a, and a right end of the bottom surface of plate 132b is parallelly adjoined to (preferably affixed to) a rear end of the upper longitudinal edge of frame 131b. A left end of bar 133a is perpendicularly adjoined to (preferably affixed to) a front lower corner of an inner side surface of frame 131a, and a right end of bar 133a is perpendicularly adjoined to (preferably affixed to) a front lower corner of an inner side surface of frame 131b. A left end of the rear bar is perpendicularly adjoined to (preferably affixed to) a rear lower corner of the inner side surface of frame 131a, and a right end of the rear bar is perpendicularly adjoined to (preferably affixed to) a rear lower corner of the inner side surface of frame 131b.

Still referring to FIGS. 7A and 7B, rotary die storage cart 130 further comprises a left beam 134a, a right beam 134b, a front left wheel 135a, a front right wheel 135b, a rear left wheel (not shown), and a rear right wheel 135d. A right longitudinal side of beam 134a is parallelly adjoined to (preferably affixed to) and aligned with a lower longitudinal portion of an outer surface of frame 131a. Wheel 135a is adjoined to (preferably detachably coupled to) a front end of a lower longitudinal side of beam 134a and downwardly extended therefrom. The rear left wheel is adjoined to (preferably detachably coupled to) a rear end of the lower longitudinal side of beam 134a and downwardly extended therefrom. A left longitudinal side of beam 134b is parallelly adjoined to (preferably affixed to) and aligned with a lower longitudinal portion of an outer surface of frame 131b. Wheel 135b is adjoined to (preferably detachably coupled to) a front end of a lower longitudinal side of beam 134b and downwardly extended therefrom. Wheel 135d is adjoined to (preferably detachably coupled to) a rear end of the lower longitudinal side of beam 134b and downwardly extended therefrom.

Still referring to FIGS. 7A and 7B, rotary die storage cart 130 further comprises six (6) rotary die shelves 136. Each rotary die shelf 136 includes a left angle iron 136a and a right angle iron 136b to support the longitudinal edges of a rotary die, e.g. rotary die 10 (FIG. 1). Each left angle iron 136a is adjoined to (preferably affixed to) the inner surface of frame 131a and uniformly spaced along the inner surface of frame 131a. Each right angle iron 136b is adjoined to (preferably affixed to) the inner surface of frame 131b and uniformly spaced along the inner surface of frame 131b. The present inventions contemplates that one or more of rotary die shelves 136 can further include a board or any other supporting object adjoined to left angle iron 136a and right angle iron 136b. Alternatively, the present inventions contemplates that a board or any other supporting object can be substituted for left angle irons 136a and right angle irons 136b, and similarly adjoined to frame 131a and frame 131b.

Referring to FIG. 8, a front view of a rotary die storage rack 111' as a modified embodiment of rotary die storage rack 111 (FIGS. 3A–3D) is shown. Rotary die storage rack 111' comprises frame 112, guide rail 114, angle iron 115, guide rail 116, angle iron 117, angle iron 118, and angle iron 119 as previously illustrated and described herein in connection with FIGS. 3A–3D. Rotary die storage rack 111' further comprises a plurality of rotary die shelves 113. A first subset of rotary die shelves 113 located on an upper left end of frame 112 form one (1) column and eleven (11) rows of rotary die shelves 113, and a second subset of rotary die shelves 113 form a grid of eight (8) columns and twenty-one rows (21) of rotary die shelves 113. Rotary die shelves 113 are adjoined to frame 112 as previously illustrated and described herein in connection with FIGS. 3A–3B. A lower left end of frame 112 is void of rotary die shelves 113 to enable rotary die storage cart 130 (FIGS. 7A and 7B) to be disposed within frame 112, and to enable rotary die shelves 136 of rotary die storage cart 130 to be similarly accessible through the side opening of frame 112. It is to be appreciated that rotary die storage rack 111' is advantageous over rotary die storage rack 11 (FIG. 1) as related to an efficient use of floor space for a storage and retrieval of a significant amount of rotary dies.

Figure 9:
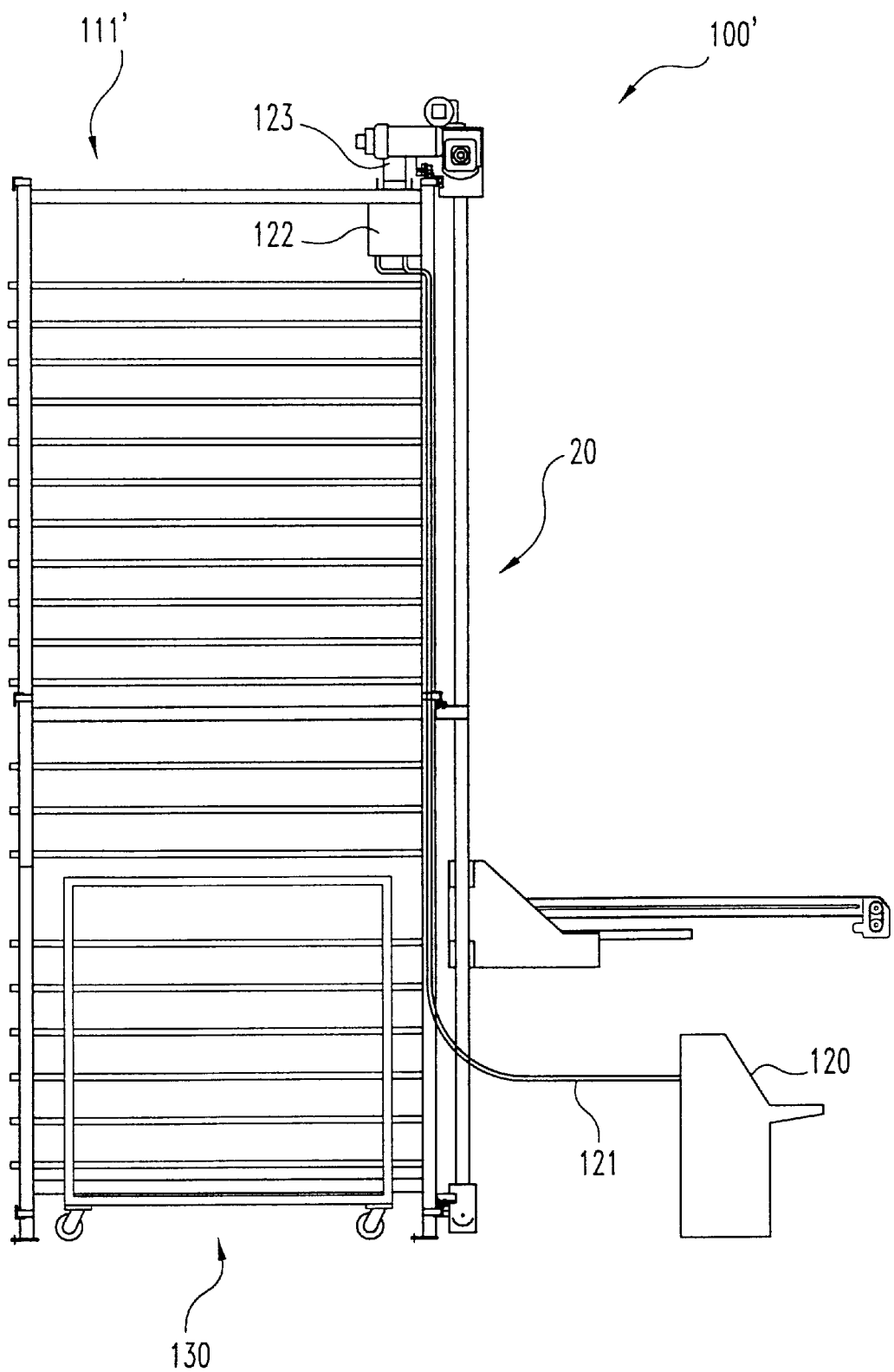
FIG. 9 is a side surface view of another embodiment of an automated rotary die storage and retrieval system in accordance with the present inventions.

Referring to FIG. 9, an automated rotary die storage and retrieval system 100' as a modified embodiment of automated rotary die storage and retrieval system 100 (FIGS. 4A and 4B) is shown. System 100' comprises rotary die storage and retrieval unit 20 as previously illustrated and described herein in connection with FIGS. 2A–2E; rotary die storage rack 111' as previously illustrated and described herein in connection with FIG. 8 with rotary die storage and retrieval unit 20 movably mounted thereon adjacent a front side opening of rotary die storage rack 111'; computer 120 as previously illustrated and described in connection with FIGS. 4A and 4B; and rotary die storage cart 130 as previously illustrated and described herein in connection with FIGS. 7A and 7B. It is to be appreciated that, at an operation site for utilizing a rotary die to make a box, etc., up to six (6) rotary dies ready to be stored upon a rotary die shelf 113 of rotary die storage rack 111' can be manually placed upon up to six (6) rotary die shelves 136, correspondingly, of rotary die storage cart 130, and then transported to rotary die storage rack 111'. Subsequently, rotary die storage cart 130 can be disposed within frame 112 of rotary die storage rack 111', and rotary die storage and retrieval unit 120 can be utilized to retrieve a rotary die from upon a rotary die shelf 136 of rotary die storage cart 130 and to store the retrieved rotary die upon a rotary die shelf 113 of rotary die storage rack 111'. Conversely, it is to be appreciated that up to six (6) rotary dies ready to be utilized to make a box, etc., at an operation site can be retrieved from upon a rotary die shelf 113 of rotary die storage rack 111' by rotary die storage and retrieval unit 20 and then stored upon up to six (6) rotary die shelf 136, correspondingly, of rotary die storage cart 136. Subsequently, rotary die storage cart 130 can be disposed out of frame 112 and transported to the operation site whereby an appropriate rotary die can be manually retrieved from a rotary die shelf 136 of rotary die storage cart 130.

What is claimed is:

1. A system for an automated storage and retrieval of a rotary die, said system comprising:

a rotary die storage rack including
a first frame having a side opening, and
a rotary die shelf disposed within said first frame, said rotary die shelf being accessible through said side opening of said first frame; and a rotary die storage and retrieval unit including
a second frame movably adjoined to said first frame, said second frame being adjacent said side opening of said first frame whereby said second frame is displaceable alongside said side opening of said first frame;
means for aligning said second frame with said rotary die shelf;
a carriage movably adjoined to said second frame whereby said carriage is displaceable along said second frame;
means for aligning said carriage with said rotary die shelf when said second frame is aligned with said rotary die shelf;
a shuttle movably adjoined to said carriage whereby said shuttle is displaceable along said carriage, said shuttle being adjacent said side opening of said first frame when said second frame and said carriage are aligned with said rotary die shelf whereby said shuttle is extendable into and retractable out of said side opening of said first frame, said shuttle further being functional to support the rotary die;
means for extending at least a portion of said shuttle into said side opening of said first frame when said second frame and said carriage are aligned with said rotary die shelf;
means for retracting said at least a portion of said shuttle out of said side opening of said first frame when said second frame and said carriage are aligned with said rotary die shelf; and wherein said shuttle includes:
a first track movably adjoined to said carriage;
a second track movably adjoined to said carriage, said second track being spatially aligned with said first track;
a conveyor belt disposed between said first track and said second track, said conveyor belt being functional to support the rotary die; and
means for rotating said conveyor belt when the rotary die is being supported by said conveyor belt to thereby displace the rotary die alongside said first track and said second track.

2. The system of claim 1 wherein said rotary die shelf is adjoined to said first frame.

3. The system of claim 1
wherein said first frame includes a guide rail; and
wherein said second frame includes at least one pair of cam wheels rotatably adjoined to said guide rail whereby said second frame is displaceable alongside said side opening of said first frame.

4. The system of claim 1
wherein said first frame includes a guide rail and a guide bar adjoined to said guide rail; and
wherein said second frame includes at least one wheel rotatably abutting said guide bar and adjacent said guide bar whereby said second frame is displaceable alongside said side opening of said first frame.

5. The system of claim 1 further comprising means for ascertaining an alignment of said second frame with said rotary die shelf.

6. The system of claim 1 further comprising means for ascertaining an alignment of said carriage with said rotary die shelf when said second frame is aligned with said rotary die shelf.

7. The system of claim 1 further comprising means for indicating the rotary die being fully disposed outside of said side opening of said first frame when said shuttle is supporting the rotary die.

8. The system of claim 1 further comprising means for indicating the rotary die being fully disposed within said side opening of said first frame when said shuttle is supporting the rotary die.

9. A system for an automated storage and retrieval of a rotary die, said system comprising:
a rotary die storage rack including
a first frame having a side opening, and
a rotary die shelf disposed within said first frame, said rotary die shelf accessible through said side opening of said first frame; and
a rotary die storage and retrieval unit including
a second frame movably adjoined to said first frame, said second frame being adjacent said side opening of said first frame whereby said second frame is displaceable alongside said side opening of said first frame;
a frame driver adjoined to said second frame, said frame driver being operable to transmit a first translational force to said second frame in a first direction of said rotary die shelf to thereby displace said second frame alongside said side opening of said first frame in said first direction of said rotary die shelf whereby said second frame can be aligned with said rotary die shelf;
a carriage movably adjoined to said second frame whereby said carriage is displaceable along said second frame;
a carriage driver adjoined to said carriage, said carriage driver being operable to transmit a second translational force to said carriage in a second direction of said rotary die shelf when said second frame is aligned with said rotary die shelf to thereby displace said carriage along said second frame in said second direction of said rotary die shelf whereby said carriage can be aligned with said rotary die shelf;
a shuttle movably adjoined to said carriage whereby said shuttle is displaceable along said carriage, said shuttle being adjacent said side opening of said first frame when said second frame and said carriage are aligned with said rotary die shelf whereby said shuttle is extendable into and retractable out of said side opening of said first frarne, said shuttle further being functional to support the rotary die; and
a shuttle driver adjoined to said shuttle, said shuttle driver being operable to transmit a third translational force to said shuttle in a third direction of said rotary die shelf when said second frame and said carriage are aligned with said rotary die shelf to thereby displace said shuttle along said carriage in said third direction of said rotary die shelf whereby at least a portion of said shuttle is extendable into said side opening of said first frame, said shuttle driver further being operable to transmit a fourth translational force to said shuttle in a fourth direction when said second frame and said carriage are aligned with said rotary die shelf to thereby displace said shuttle in said fourth direction, said third direction and said fourth direction being diametric whereby said at least a portion of said shuttle is retractable out of said side opening of said first frame, and wherein said shuttle includes:
a first track movably adjoined to said carriage;
a second track movably adjoined to said carriage, said second track being spatially aligned with said first track;
a conveyor belt disposed between said first track and said second track, said conveyor belt being functional to support the rotary die, said conveyor belt further being rotatable in a fifth direction and in a sixth direction, said fifth direction and said sixth direction being diametric; and
a conveyor driver adjoined to said conveyor belt, said conveyor driver being operable to transmit a first rotational force to said conveyor belt to thereby rotate said conveyor belt in said fifth direction whereby the rotary die is displaced alongside said first track and said second track in said fifth direction when the rotary die is being supported by said conveyor belt, said conveyor driver further being operable to transmit a second rotational force to said conveyor belt to thereby rotate said conveyor belt in said sixth direction whereby the rotary die is displaced alongside said first track and said second track in said sixth direction when the rotary die is being supported by said conveyor belt.

10. The system of claim 9 further comprising a computer, said computer being operable to transmit a signal, wherein said frame driver is operatively coupled to said computer to receive said signal when said signal is transmitted by said computer to thereby transmit said first translational force to said second frame in response to said signal.

11. The system of claim 9 further comprising a computer, said computer being operable to transmit a signal, wherein said carriage driver is operatively coupled to said computer to receive said signal when said signal is transmitted by said computer to thereby transmit said second translational force to said carriage in response to said signal.

12. The system of claim 9 further comprising a computer, said computer being operable to transmit a first signal and a second signal,
wherein said shuttle driver is operatively coupled to said computer to receive said first signal when said first signal is transmitted by said computer to thereby transmit said third translational force to said shuttle, and
wherein said shuttle driver is operatively coupled to said computer to receive said second signal when said second signal is transmitted by said computer to thereby transmit said fourth translational force to said shuttle.

13. The system of claim 9 wherein said rotary die shelf is adjoined to said first frame.

14. The system of claim 9
wherein said first frame includes a guide rail; and
wherein said second frame includes at least one pair of cam wheels rotatably adjoined to said guide rail whereby said second frame is displaceable alongside said side opening of said first frame.

15. The system of claim 9
wherein said first frame includes a guide rail and a guide bar adjoined to said guide rail; and
wherein said second frame includes at least one wheel rotatably abutting said guide rail and adjacent said guide bar whereby said second frame is displaceable alongside said side opening of said first frame.

16. The system of claim 9 wherein said frame driver includes:
a spur gear adjoined to said second frame, said spur gear further rotatably adjoined to said first frame whereby said spur gear is displaceable along said first frame; and
a motor adjoined to said spur gear, said motor being operable to transmit a rotational force to said spur gear to thereby rotate said spur gear whereby said first translational force is transmitted to said second frame.

17. The system of claim 16 wherein said first frame includes
a guide rail adjoined to said first frame; and
a plurality of gear teeth adjoined to said guide rail, said spur gear being engaged with said plurality of gear teeth whereby said spur gear is rotatably displaced along said plurality of gear teeth in response to said rotational force.

18. The system of claim 16 further comprising a computer, said computer being operable to transmit a first signal,
wherein said motor is operatively coupled to said computer to receive said first signal when said first signal is transmitted by said computer to thereby transmit said rotational force to said spur gear in response to said first signal.

19. The system of claim 18 wherein said frame driver further includes an encoder adjoined to said motor said encoder being operatively coupled to said computer to transmit a second signal to said computer, said second signal being an indication of a degree and a direction of said rotational force whereby a position of said second frame alongside said side opening of said first frame is ascertainable by said computer.

20. The system of claim 9 wherein said carriage driver includes:
a chain including a plurality of links, at least one link of said plurality of links being adjoined to said carriage; and
a motor adjoined to said chain, said motor being operable to transmit a rotational force to said chain to thereby rotate said plurality of links whereby said second translational force is transmitted to said carriage.

21. The system of claim 20 further comprising a computer, said computer being operable to transmit a first signal, wherein said motor is operatively coupled to said computer to receive said first signal when said first signal is transmitted by said computer to thereby transmit said rotational force to said chain in response to said first signal.

22. The system of claim 21 wherein said carriage driver further includes an encoder adjoined to said motor said encoder being operatively coupled to said computer to transmit a second signal to said computer, said second signal being an indication of a degree and a direction of said rotational force whereby a position of said carriage along said second frame is ascertainable by said computer.

23. The system of claim 9 wherein said shuttle driver includes:

at least one spur gear rotatably adjoined with said shuttle, said at least one spur gear being rotatable in a fifth direction and in a sixth direction, said fifth direction and said sixth direction being diametric; and
a motor adjoined to said at least one spur gear, said motor being operable to transmit a first rotational force to said at least one spur gear in said fifth direction to thereby rotate said at least one spur gear in said fifth direction whereby said third translational force is transmitted to said shuttle, said motor further being operable to transmit a second rotational force to said at least one spur gear in said sixth direction to thereby rotate said at least one spur gear in said sixth direction whereby said fourth translational force is transmitted to said shuttle.

24. The system of claim 23 further comprising a computer, said computer being operable to transmit a first signal and a second signal,
wherein said motor is operatively coupled to said computer to receive said first signal when said first signal is transmitted by said computer to thereby transmit said first rotational force to said at least one spur gear in response to said first signal, and
wherein said motor is operatively coupled to said computer to receive said second signal when said second signal is transmitted by said computer to thereby transmit said second rotational force to said at least one spur gear in response to said second signal.

25. The system of claim 9 wherein said conveyor driver includes:
at least one sprocket rotatably adjoined with said conveyor belt, said at least one sprocket being rotatable in said fifth direction and in said sixth direction; and
a motor adjoined to said at least one sprocket, said motor being operable to transmit a third rotational force to said at least one sprocket to thereby rotate said at least one sprocket in said fifth direction whereby said first rotational force is transmitted to said conveyor belt, said motor further being operable to transmit a fourth rotational force to said at least one sprocket to thereby rotate said at least one sprocket in said sixth direction whereby said second rotational force is transmitted to said conveyor belt.

26. The system of claim 25 further comprising a computer, said computer being operable to transmit a first signal and a second signal,
wherein said motor is operatively coupled to said computer to receive said first signal when said first signal is transmitted by said computer to thereby transmit said third rotational force to said at least one sprocket in response to said first signal, and
wherein said motor is operatively coupled to said computer to receive said second signal when said second signal is transmitted by said computer to thereby transmit said fourth rotational force to said at least one sprocket in response to said second signal.

27. The system of claim 9 further comprising a photo eye adjoined to said carriage, said photo eye being operable to radiate a ray of light, said photo eye further being operable to transmit a first signal as a indication of at least a portion of the rotary die intersecting said ray of light when said shuttle is supporting the rotary die.

28. The system of claim 27 further comprising a computer, said computer being operable to transmit a second signal,
wherein said photo eye is operatively coupled to said computer to receive said second signal when said second signal is transmitted by said computer to thereby radiate said ray of light, and wherein said photo eye is operatively coupled to said computer to transmit said first signal to said computer when the at least a portion of the rotary die intersects said ray of light.

29. The system of claim 27 wherein said photo eye is movably adjoined to said carriage, said photo eye being displaceable in said third direction and in said fourth direction.

30. The system of claim 29 wherein said photo eye is adjoined to said shuttle whereby said photo eye and said shuttle are concurrently displaced in said third direction when said shuttle driver transmits said third translational force to said shuttle, and whereby said photo eye and said shuttle are concurrently displaced in said fourth direction when said shuttle driver transmits said fourth translational force to said shuttle.

31. The system of claim 9 further comprising a magnetic switch adjoined to a distal end of said carriage, wherein said shuttle includes a ferromagnetic tab plate disposed at a proximal end of said shuttle, and wherein said magnetic switch is operable to transmit a signal in response to said ferromagnetic tab plate being adjacent said magnetic switch.

32. The system of claim 31 further comprising a computer, said computer being operable to transmit a second signal, wherein said magnetic switch is operatively coupled to said computer to receive said second signal when said second signal is transmitted by said computer to thereby transmit said first signal to said computer when said ferromagnetic tab plate is adjacent said magnetic switch.

33. The system of claim 9 further comprising a magnetic switch adjoined to a proximal end of said carriage, wherein said shuttle includes a ferromagnetic tab plate disposed at a distal end of said shuttle, and wherein said magnetic switch is operable to transmit a signal in response to said ferromagnetic tab plate being adjacent said magnetic switch.

34. The system of claim 33 further comprising a computer, said computer being operable to transmit a second signal, wherein said magnetic switch is operatively coupled to said computer to receive said second signal when said second signal is transmitted by said computer to thereby transmit said first signal to said computer said ferromagnetic tab plate is adjacent said magnetic switch.

35. A system for an automated storage and retrieval of a rotary die, said system comprising:

a rotary die storage rack including a first frame having a side opening, and a rotary die shelf disposed within said first frame, said rotary die shelf accessible through said side opening of said first frame; and a rotary die storage and retrieval unit including a second frame movably adjoined to said first frame, said second frame being adjacent said side opening of said first frame whereby said second frame is displaceable alongside said side opening of said first frame;

a frame driver adjoined to said second frame, said frame driver being operable to transmit a first translational force to said second frame in a first direction of said rotary die shelf to thereby displace said second frame alongside said side opening of said first frame in said first direction of said rotary die shelf whereby said second frame can be aligned with said rotary die shelf;

a carriage movably adjoined to said second frame whereby said carriage is displaceable along said second frame;

a carriage driver adjoined to said carriage, said carriage driver being operable to transmit a second translational force to said carriage in a second direction of said rotary die shelf when said second frame is aligned with said rotary die shelf to thereby displace said carriage along said second frame in said second direction of said rotary die shelf whereby said carriage can be aligned with said rotary die shelf;

a shuttle movably adjoined to said carriage whereby said shuttle is displaceable along said carriage, said shuttle being adjacent said side opening of said first frame when said second frame and said carriage are aligned with said rotary die shelf whereby said shuttle is extendable into and retractable out of said side opening of said first frame, said shuttle further being functional to support the rotary die; and a shuttle driver adjoined to said shuttle, said shuttle driver being operable to transmit a third translational force to said shuttle in a third direction of said rotary die shelf when said second frame and said carriage are aligned with said rotary die shelf to thereby displace said shuttle along said carriage in said third direction of said rotary die shelf whereby at least a portion of said shuttle is extendable into said side opening of said first frame, said shuttle driver further being operable to transmit a fourth translational force to said shuttle in a fourth direction when said second frame and said carriage are aligned with said rotary die shelf to thereby displace said shuttle in said fourth direction, said third direction and said fourth direction being diametric whereby said at least a portion of said shuttle is retractable out of said side opening of said first frame, and further comprising:

a first platform;

a second platform, said first platform and said second platform being spatially aligned and cooperatively functional to support the rotary die;

a first thruster adjoined to said first platform, said first thruster being operable to transmit a fifth translational force to said first platform in a fifth direction to thereby displace said first platform in said fifth direction, said first thruster further being operable to transmit a sixth translational force to said first platform in a sixth direction to thereby displace said first platform in said sixth direction, said fifth direction and said sixth direction being diametric; and a second thruster adjoined to said second platform, said second thruster being operable to transmit a seventh translational force to said second platform in said fifth direction to thereby displace said second platform in said fifth direction, said second thruster further being operable to transmit an eighth translational force to said second platform in said sixth direction to thereby displace said second platform in said sixth direction.

36. The system of claim 35 further comprising a computer, said computer being operable to transmit a first signal and a second signal, wherein said first thruster is operatively coupled to said computer to receive said first signal when said first signal is transmitted by said computer to thereby transmit said fifth translational force to said first platform, wherein said second thruster is operatively coupled to said computer to receive said first signal when said first signal is transmitted by said computer to thereby transmit said seventh translational force to said second platform, wherein said first thruster is operatively coupled to said computer to receive said second signal when said second signal is transmitted by said computer to thereby transmit said sixth translational force to said first platform, and wherein said second thruster is operatively coupled to said computer to receive said second signal when said second signal is transmitted by said computer to thereby transmit said eighth translational force to said second platform.

37. A rotary die storage and retrieval unit for an automated storage of a rotary die upon a rotary die shelf and for an automated retrieval of the rotary die from upon the rotary die shelf, the rotary die shelf being disposed within a rotary die storage rack, the rotary die shelf further being accessible through a side opening of the rotary die storage rack, said rotary die storage and retrieval unit comprising:

a frame movably mountable to the rotary die storage rack, said frame being adjacent the side opening of the rotary die storage rack when said frame is movably mounted to the rotary die storage rack whereby said frame is displaceable alongside the side opening of the rotary die storage rack;

means for aligning said frame with the rotary die shelf when said frame is movably mounted to the rotary die storage rack;

a carriage movably adjoined to said frame whereby said carriage is displaceable along said frame;

means for aligning said carriage with the rotary die shelf when said frame is aligned with the rotary die shelf;

a shuttle movably adjoined to said carriage whereby said shuttle is displaceable along said carriage, said shuttle being adjacent the side opening of the rotary die storage rack when said frame and said carriage are aligned with the rotary die shelf whereby said shuttle is extendable into and retractable out of the side opening of the rotary die storage rack, said shuttle further being functional to support the rotary die;

means for extending at least a portion of said shuttle into the side opening of the rotary die storage rack when said frame and said carriage are aligned with the rotary die shelf; and means for retracting said at least a portion of said shuttle out of the side opening of the rotary die storage rack when said frame and said carriage are aligned with the rotary die shelf, and wherein said shuttle includes:

a first track movably adjoined to said carriage, a second track movably adjoined to said carriage, said second track being spatially aligned with said first track;

a conveyor belt disposed between said first track and said second track, said conveyor belt being functional to support the rotary die; and means for rotating said conveyor belt when the rotary die is being supported by said conveyor belt to thereby displace the rotary die alongside said first track and said second track.

38. The rotary die storage and retrieval unit of claim 37 wherein said frame includes at least one pair of cam wheels, said at least one pair of cam wheels being rotatably mountable to the rotary die storage rack whereby said frame is displaceable alongside the side opening of the rotary die storage rack.

39. The rotary die storage and retrieval unit of claim 37 further comprising means for ascertaining an alignment of said frame with the rotary die shelf when said frame is movably mounted to the rotary die storage rack.

40. The rotary die storage and retrieval unit of claim 37 further comprising means for ascertaining an alignment of said carriage with the rotary die shelf when said frame is aligned with the rotary die shelf.

41. The rotary die storage and retrieval unit of claim 37 further comprising means for indicating the rotary die being fully disposed outside of the side opening of the rotary die storage rack when said shuttle is supporting the rotary die.

42. The rotary die storage and retrieval unit of claim 37 further comprising means for indicating the rotary die being fully disposed within the side opening of the rotary die storage rack when said shuttle is supporting the rotary die.

43. A rotary die storage and retrieval unit for an automated storage of a rotary die upon a rotary die shelf and for an automated retrieval of the rotary die from upon the rotary die shelf, the rotary die shelf being disposed within a rotary die storage rack, the rotary die shelf further being accessible through a side opening of the rotary die storage rack, said rotary die storage and retrieval unit comprising:

a frame movably mountable to the rotary die storage rack, said frame being adjacent the side opening of the rotary die storage rack when said frame is movably mounted to the rotary die storage rack whereby said frame is displaceable alongside the side opening of the rotary die storage rack;

a frame driver adjoined to said frame, said frame driver being operable to transmit a first translational force to said frame in a first direction of the rotary die shelf when said frame is movably mounted to the rotary die storage rack to thereby displace said frame alongside the side opening of the rotary die storage rack in said first direction of the rotary die shelf whereby said frame can be aligned with the rotary die shelf;

a carriage movably adjoined to said frame whereby said carriage is displaceable along said frame;

a carriage driver adjoined to said carriage, said carriage driver being operable to transmit a second translational force to said carriage in a second direction of the rotary die shelf when said frame is aligned with the rotary die shelf to thereby displace said carriage along said frame in said second direction of the rotary die shelf whereby said carriage can be aligned with the rotary die shelf;

a shuttle movably adjoined to said carriage whereby said shuttle is displaceable along said carriage, said shuttle being adjacent the side opening of the rotary die storage rack when said frame and said carriage are aligned with the rotary die shelf whereby said shuttle is extendable into and retractable out of the side opening of the rotary die storage rack, said shuttle further being functional to support the rotary die; and a shuttle driver adjoined to said shuttle, said shuttle driver being operable to transmit a third translational force to said shuttle in a third direction of the rotary die shelf when said frame and said carriage are aligned with the rotary die shelf to thereby displace said shuttle along said carriage in said third direction of the rotary die shelf whereby at least a portion of said shuttle is extendable into the side opening of the rotary die storage rack, said shuttle driver further being operable to transmit a fourth translational force to said shuttle in a fourth direction when said frame and said carriage are aligned with the rotary die shelf to thereby displace said shuttle along said carriage is said fourth direction, said third direction and said fourth direction being diametric whereby said at least a portion of said shuttle is retractable out of the side opening of the rotary die storage rack, and wherein said shuttle includes:
- a first track movably adjoined to said carriage;
- a second track movably adjoined to said carriage, said second track being spatially aligned with said first track;
- a conveyor belt disposed between said first track and said second track, said conveyor belt being functional to support the rotary die, said conveyor belt further being rotatable in a fifth direction and in a sixth direction, said fifth direction and said sixth direction being diametric; and
- a conveyor driver adjoined to said conveyor belt, said conveyor driver being operable to transmit a first rotational force to said conveyor belt to thereby rotate said conveyor belt in said fifth direction whereby the rotary die is displaced alongside said first track and said second track in said fifth direction when the rotary die is being supported by said conveyor belt, said conveyor driver further being operable to transmit a second rotational force to said conveyor belt to thereby rotate said conveyor belt in said sixth direction whereby the rotary die is displaced alongside said first track and said second track in said sixth direction when the rotary die is being supported by said conveyor belt.

44. The rotary die storage and retrieval unit of claim 43 wherein said frame includes at least one pair of cam wheels, said at least one pair of cam wheels being rotatably mountable to the rotary die storage rack whereby said frame is displaceable alongside the side opening of the rotary die storage rack.

45. The rotary die storage and retrieval unit of claim 43 wherein said frame driver includes:
- at least one spur gear adjoined to said frame, said at least one spur gear further rotatably adjoined to the rotary die storage rack when said frame is movably mounted to the rotary die storage rack whereby said at least one spur gear is displaceable along the rotary die storage rack; and
- a motor adjoined to said at least one spur gear, said motor being operable to transmit a rotational force to said at least one spur gear when said at least one spur gear is rotatably adjoined to the rotary die storage rack to thereby rotate said at least one spur gear whereby said first translational force is transmitted to said frame.

46. The rotary die storage and retrieval unit of claim 45 wherein said frame driver further includes an encoder adjoined to said motor said encoder being operable to transmit a signal as an indication of a degree and a direction of said rotational force whereby a position of said frame alongside the side opening of the rotary die storage rack when said frame is movably mounted to the rotary die storage rack is ascertainable.

47. The rotary die storage and retrieval unit of claim 43 wherein said carriage driver includes:
- a chain including a plurality of links, at least one link of said plurality of links being adjoined to said carriage; and
- a motor adjoined to said chain, said motor being operable to transmit a rotational force to said chain to thereby rotate said plurality of links whereby said second translational force is transmitted to said carriage.

48. The rotary die storage and retrieval unit of claim 47 wherein said carriage driver further includes an encoder adjoined to said motor said encoder being operable to transmit a signal as an indication of a degree and a direction of said rotational force whereby a position of said carriage along said frame is ascertainable.

49. The rotary die storage and retrieval unit of claim 43 wherein said shuttle driver includes:
- at least one spur gear rotatably adjoined to said shuttle, said at least one spur gear being rotatable in a fifth direction and in a sixth direction, said fifth direction and said sixth direction being diametric; and
- a motor adjoined to said at least one spur gear, said motor being operable to transmit a first rotational force to said at least one spur gear in said fifth direction to thereby rotate said at least one spur gear in said fifth direction whereby said third translational force is transmitted to said shuttle, said motor further being operable to transmit a second rotational force to said at least one spur gear in said sixth direction to thereby rotate said spur gear in said sixth direction whereby said fourth translational force is transmitted to said shuttle.

50. The rotary die storage and retrieval unit of claim 43 wherein said conveyor driver includes:
- at least one sprocket rotatably adjoined to said conveyor belt, said at least one sprocket being rotatable in said fifth direction and in said sixth direction; and
- a motor adjoined to said at least one sprocket, said motor being operable to transmit a third rotational force to said at least one sprocket to thereby rotate said at least one sprocket in said fifth direction whereby said first rotational force is transmitted to said conveyor belt, said motor further being operable to transmit a fourth rotational force to said at least one sprocket, said third rotational force and said fourth rotational force being diametric to thereby rotate said at least one sprocket in said sixth direction whereby said second rotational force is transmitted to said conveyor belt.

51. The rotary die storage and retrieval unit of claim 43 further comprising a photo eye adjoined to said carriage, said photo eye being operable to radiate a ray of light, said photo eye further being operable to transmit a signal as a indication of at least a portion of the rotary die intersecting said ray of light when said shuttle is supporting the rotary die.

52. The rotary die storage and retrieval unit of claim 51 wherein said photo eye is movably adjoined to said carriage, said photo eye being displaceable in said third direction and in said fourth direction.

53. The rotary die storage and retrieval unit of claim 52 wherein said photo eye is adjoined to said shuttle whereby said photo eye and said shuttle are concurrently displaced in said third direction when said shuttle driver transmits said third translational force to said shuttle, and whereby said photo eye and said shuttle are concurrently displaced in said fourth direction when said shuttle driver transmits said fourth translational force to said shuttle.

54. The rotary die storage and retrieval unit of claim 43 further comprising a magnetic switch adjoined to a distal end of said carriage,
- wherein said shuttle includes a ferromagnetic tab plate disposed at a proximal end of said shuttle, and
- wherein said magnetic switch is operable to transmit a signal in response to said ferromagnetic tab plate being adjacent said magnetic switch.

55. The rotary die storage and retrieval unit of claim 43 further comprising a magnetic switch adjoined to a proximal end of said carriage, wherein said shuttle includes a ferromagnetic tab plate disposed at a distal end of said shuttle, and wherein said magnetic switch is operable to transmit a signal in response to said ferromagnetic tab plate being adjacent said magnetic switch.

56. A rotary die storage and retrieval unit for an automated storage of a rotary die upon a rotary die shelf and for an automated retrieval of the rotary die from upon the rotary die shelf, the rotary die shelf being disposed within a rotary die storage rack, the rotary die shelf further being accessible through a side opening of the rotary die storage rack, said rotary die storage and retrieval unit comprising:

a frame movably mountable to the rotary die storage rack, said frame being adjacent the side opening of the rotary die storage rack when said frame is movably mounted to the rotary die storage rack whereby said frame is displaceable alongside the side opening of the rotary die storage rack;

a frame driver adjoined to said frame, said frame driver being operable to transmit a first translational force to said frame in a first direction of the rotary die shelf when said frame is movably mounted to the rotary die storage rack to thereby displace said frame alongside the side opening of the rotary die storage rack in said first direction of the rotary die shelf whereby said frame can be aligned with the rotary die shelf;

a carriage movably adjoined to said frame whereby said carriage is displaceable along said frame;

a carriage driver adjoined to said carriage, said carriage driver being operable to transmit a second translational force to said carriage in a second direction of the rotary die shelf when said frame is aligned with the rotary die shelf to thereby displace said carriage along said frame in said second direction of the rotary die shelf whereby said carriage can be aligned with the rotary die shelf;

a shuttle movably adjoined to said carriage whereby said shuttle is displaceable along said carriage, said shuttle being adjacent the side opening of the rotary die storage rack when said frame and said carriage are aligned with the rotary die shelf whereby said shuttle is extendable into and retractable out of the side opening of the rotary die storage rack, said shuttle further being functional to support the rotary die; and a shuttle driver adjoined to said shuttle, said shuttle driver being operable to transmit a third translational force to said shuttle in a third direction of the rotary die shelf when said frame and said carriage are aligned with the rotary die shelf to thereby displace said shuttle along said carriage in said third direction of the rotary die shelf whereby at least a portion of said shuttle is extendable into the side opening of the rotary die storage rack, said shuttle driver further being operable to transmit a fourth translational force to said shuttle in a fourth direction when said frame and said carriage are aligned with the rotary die shelf to thereby displace said shuttle along said carriage is said fourth direction, said third direction and said fourth direction being diametric whereby said at least a portion of said shuttle is retractable out of the side opening of the rotary die storage rack, and further comprising:

a first platform;

a second platform, said first platform and said second platform being spatially aligned and cooperatively functional to support the rotary die;

a first thruster adjoined to said first platform, said first thruster being operable to transmit a fifth translational force to said first platform in a fifth direction to thereby displace said first platform in said fifth direction, said first thruster further being operable to transmit a sixth translational force to said first platform in a sixth direction to thereby displace said first platform in said sixth direction, said fifth direction and said sixth direction being diametric; and a second thruster adjoined to said second platform, said second thruster being operable to transmit a seventh translational force to said second platform in said fifth direction to thereby displace said second platform in said fifth direction, said second thruster further being operable to transmit an eighth translational force to said second platform in said sixth direction to thereby displace said second platform in said sixth direction.

* * * * *